US012596200B2

(12) United States Patent
Snyder et al.

(10) Patent No.: US 12,596,200 B2
(45) Date of Patent: Apr. 7, 2026

(54) HYBRID NEUROMORPHIC X-RAY IMAGING SYSTEM AND METHOD OF USING THE SAME

(71) Applicant: Teledyne Dalsa B.V., Eindhoven (NL)

(72) Inventors: Jonathan Edvard Snyder, Park City, UT (US); James Joseph Miller, Tavistock (CA); Andriy A. Lomako, Waterloo (CA)

(73) Assignee: Teledyne Dalsa B.V., Eindhoven (NL)

( * ) Notice: Subject to any disclaimer, the term of this patent is extended or adjusted under 35 U.S.C. 154(b) by 250 days.

(21) Appl. No.: 18/359,654

(22) Filed: Jul. 26, 2023

(65) Prior Publication Data

US 2025/0035797 A1 Jan. 30, 2025

(51) Int. Cl.
*G01T 1/20* (2006.01)
*H04N 23/30* (2023.01)
*H04N 25/47* (2023.01)

(52) U.S. Cl.
CPC ............ *G01T 1/2018* (2013.01); *H04N 23/30* (2023.01); *H04N 25/47* (2023.01)

(58) Field of Classification Search
CPC ....... G01T 1/2018; H04N 23/30; H04N 25/47
See application file for complete search history.

(56) References Cited

U.S. PATENT DOCUMENTS 5,841,833 A * 11/1998 Mazess ................. A61B 6/463
378/146

FOREIGN PATENT DOCUMENTS

| CN | 101655984 | B | * | 2/2015 | |
|---|---|---|---|---|---|
| DE | 102019007515 | A1 | * | 4/2021 | ........... F41G 7/2253 |
| WO | WO 2020163335 | A1 | * | 8/2020 | ........... H04N 23/741 |
| WO | WO 2022106008 | A1 | | 5/2022 | |
| WO | WO 2023058671 | A1 | * | 4/2023 | ............. H04N 25/78 |

(Continued)

OTHER PUBLICATIONS

Hong, Seongin, et al. "Neuromorphic active pixel image sensor array for visual memory." ACS nano 15.9 (2021): 15362-15370. (Year: 2021).*

(Continued)

*Primary Examiner* — Edwin C Gunberg
*Assistant Examiner* — Richard O Toohey
(74) *Attorney, Agent, or Firm* — Haynes and Boone, LLP

(57) ABSTRACT

An X-ray imaging system and a method thereof are provided. In one or more embodiments, the imaging system includes an X-ray detector having neuromorphic X-ray pixels that can be combined with integrating pixels in a single hybrid detector package. The X-ray detector may generate two types of datasets (e.g., output data streams), one of integrating keyframes, the other an asynchronous event stream of intensity changes. In one or more embodiments, the method may include detecting X-rays from an imageable event using the X-ray detector, generating the two types of datasets based on the detected X-rays, and reconstructing one or more images of the imageable event based on the two types of generated datasets. By utilizing artificial intelligence/machine learning, these datasets may be combined to generate novel x-ray imaging modes that include deblurred high dynamic range real-time frame sequences or a high-speed, high dynamic range frame sequence for subsequent viewing.

20 Claims, 17 Drawing Sheets

100a

X-ray Photons

Direct Detection Material
110a
Charge Detection Circuit Board
120a

Shielding

Integrated Frames

Command/Control/Sync

Power

(56)          References Cited

FOREIGN PATENT DOCUMENTS

WO        WO 2023093986 A1 *   6/2023    ............ H04N 25/78

OTHER PUBLICATIONS

"SynSense and PROPHESEE partner to combine neuromorphic engineering expertise for developing one-chip event-based smart sensing solution for ultra-low power edge-AI," Oct. 15, 2021, PROPHESEE.
"Propesee and Sony Develop a Stacked Event-Based Vision Sensor with the Industry's Smallest Pixels and Highest HDR Performance," Feb. 19, 2020, PROPHESEE.
"DaVis 11," Jan. 2023, Lavision Focus On Imaging.
Lichtsteiner, Patrick et al., "A 128 x128 120 dB 15 US Latency Asynchronous Temporal Contrast Vision Sensor," Feb. 2008, vol. 43, pp. 566-576, IEEE Journal of Solid-State Circuits.

* cited by examiner

600

X-ray Source

Moving Attenuating Object

Scintillator Screen Image (With Motion Blur)

Event Camera

Integrating Camera

Fusion Processor

Fused Integrating and Event Camera Data

50% Event Camera Pixel
Density Regular Distribution

11% Event Camera Pixel
Density Regular Distribution

Region-of-Interest and Irregular
Event Camera Pixel Density a) Keyframe 1 with Blur b) Event Frame 1 c) Fuse Event 1 &
Keyframe 1 d) Deblur Frame with
AI Inpainting

Positive
Thershold

Negative
Thershold

Time

HYBRID NEUROMORPHIC X-RAY IMAGING SYSTEM AND METHOD OF USING THE SAME

FIELD OF INVENTION

Embodiments of the present disclosure relate generally to imaging systems and methods and, more particularly for example, to hybrid neuromorphic X-ray detector systems and methods for performing deblurred high-speed, high dynamic range real-time X-ray imaging.

BACKGROUND

Advances in digital photographic devices can lead to advances in imaging, including for example, X-ray imaging. However, X-ray imaging has historically been an integrating imaging modality. For example, when an X-ray source is turned on, a medium, such as a screen sensitive to X-ray photons, can be used to integrate the transmitted X-ray photons after attenuation by an object. This integrating medium was typically a photographic film in the past although this technique is still being used in some applications today. The advent of integrated digital detectors has supplanted X-ray sensitive films in many applications and is one of the major methods used for detecting X-ray photons today. However, the current state of the art X-ray imaging techniques has several limitations, including for example, low read out rate, at which the pixels in the digital detector arrays can be read out (e.g., "frames per second" or "fps"), a minimum detectability limit based on the noise floor of the detector device, and/or a saturation limit based on the maximum charge a pixel can store. Thus, there is a need for an X-ray detection/imaging system that offers, among many others, a low photon flux sensitivity, a high saturation limit, and the capability for rapid detection of motion in the image that can solve common X-ray imaging problems while reducing the complexity and costs of the X-ray source and the imaging system.

SUMMARY

In accordance with one or more embodiments, an imaging system is described. The imaging system includes an X-ray detector configured to detect X-rays associated with an imageable event and to generate two types of datasets based on the detected X-rays; and a processor communicatively coupled to the X-ray detector and configured to reconstruct one or more images of the imageable event based on the two types of generated datasets.

In accordance with one or more embodiments, a method of imaging is described. The method includes detecting, via an X-ray detector, X-rays from an imageable event; generating two types of datasets based on detected X-rays; and determining an imaging mode between a high-speed mode or a real-time mode based on the two types of generated datasets. If the imaging mode is determined to be the high-speed imaging mode, the method further includes defining a frame rate for capturing the imageable event; obtaining a keyframe; obtaining event data subsequent to the keyframe; reconstructing the keyframe based on the event data; deblurring the keyframe; outputting the keyframe; and saving the keyframe for viewing a later time. If the imaging mode is determined to be the real-time imaging mode, the method further includes obtaining a keyframe; obtaining event data subsequent to the keyframe; reconstructing the keyframe based on the event data; deblurring the keyframe; and outputting the keyframe.

BRIEF DESCRIPTION OF THE DRAWINGS

For a more complete understanding of the principles disclosed herein, and the advantages thereof, reference is now made to the following descriptions taken in conjunction with the accompanying drawings, in which.

It is to be understood that the figures are not necessarily drawn to scale, nor are the objects in the figures necessarily drawn to scale in relationship to one another. The figures are depictions that are intended to bring clarity and understanding to various embodiments of apparatuses, systems, and methods disclosed herein. Wherever possible, the same reference numbers will be used throughout the drawings to refer to the same or like parts. Moreover, it should be appreciated that the drawings are not intended to limit the scope of the present teachings in any way.

DETAILED DESCRIPTION

A hybrid neuromorphic X-ray detection/imaging system and methods thereof are described herein in accordance with one or more embodiments. The disclosed system and method offer capabilities that include, among many others, a low photon flux sensitivity, a high saturation limit, and rapid detection of motion in the acquired X-ray images that can solve common X-ray imaging problems. The application of neuromorphic techniques to integrating X-ray detectors can improve current imaging technologies while reducing the cost of the current imaging systems. In one or more embodiments, the disclosed imaging system includes an X-ray detector having neuromorphic X-ray pixels that can be combined with integrating pixels in a single hybrid detector package. The disclosed imaging system may generate two types of datasets, e.g., two output data streams, where the first is a stream of integrating keyframes, and the second is an asynchronous event stream of intensity changes in some pixels. In one or more embodiments, the two types of datasets can be reconstructed into one or more images, as described in further detail below. In some embodiments, these datasets may be combined via a neural network, e.g., based on artificial intelligence/machine learning, to generate novel x-ray imaging modes that include deblurred high dynamic range real-time frame sequences or a high-speed, high dynamic range frame sequence for subsequent viewing.

In order to describe the advances in the disclosed hybrid neuromorphic X-ray detection/imaging system and methods thereof, some of the underlying imaging systems and technologies are described below.

Figure 1A:
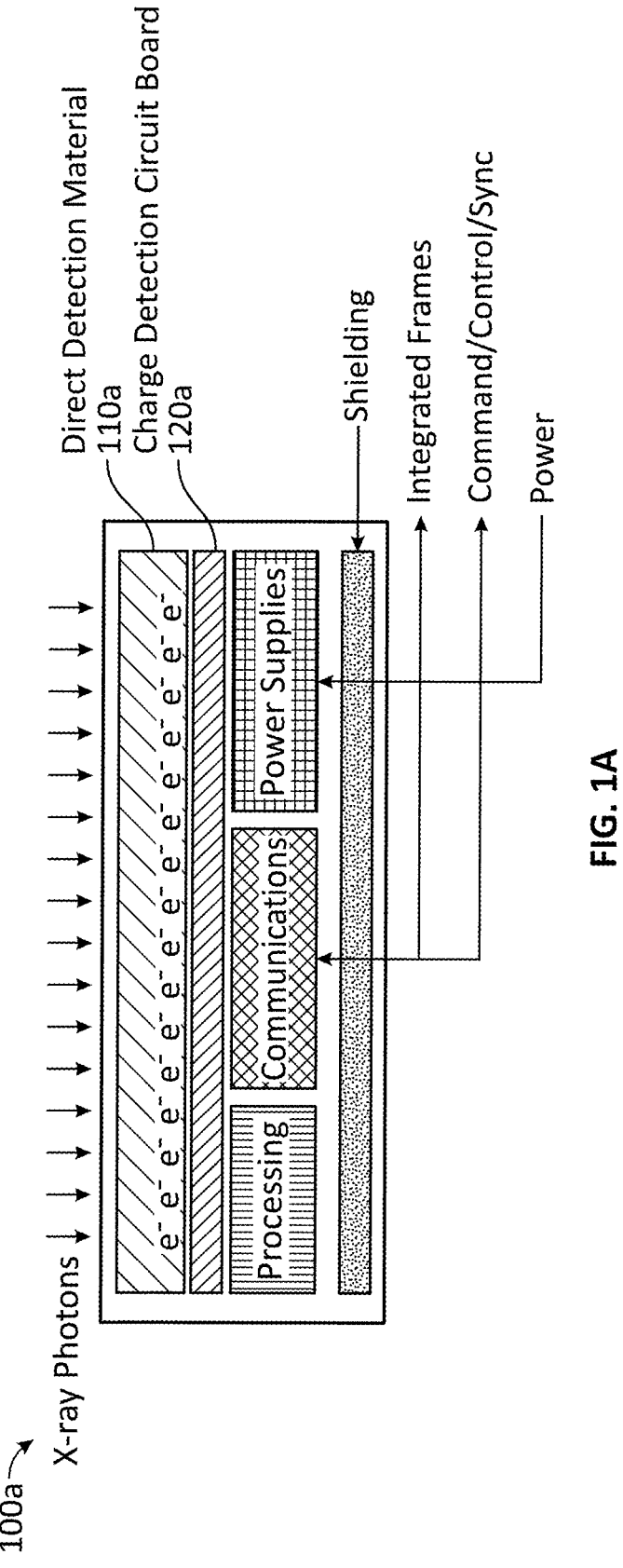
FIGS. 1A and 1B respectively illustrate schematics of a direct integrating X-ray detector and an indirect integrating X-ray detector, in accordance with one or more embodiments.
Figure 1B:
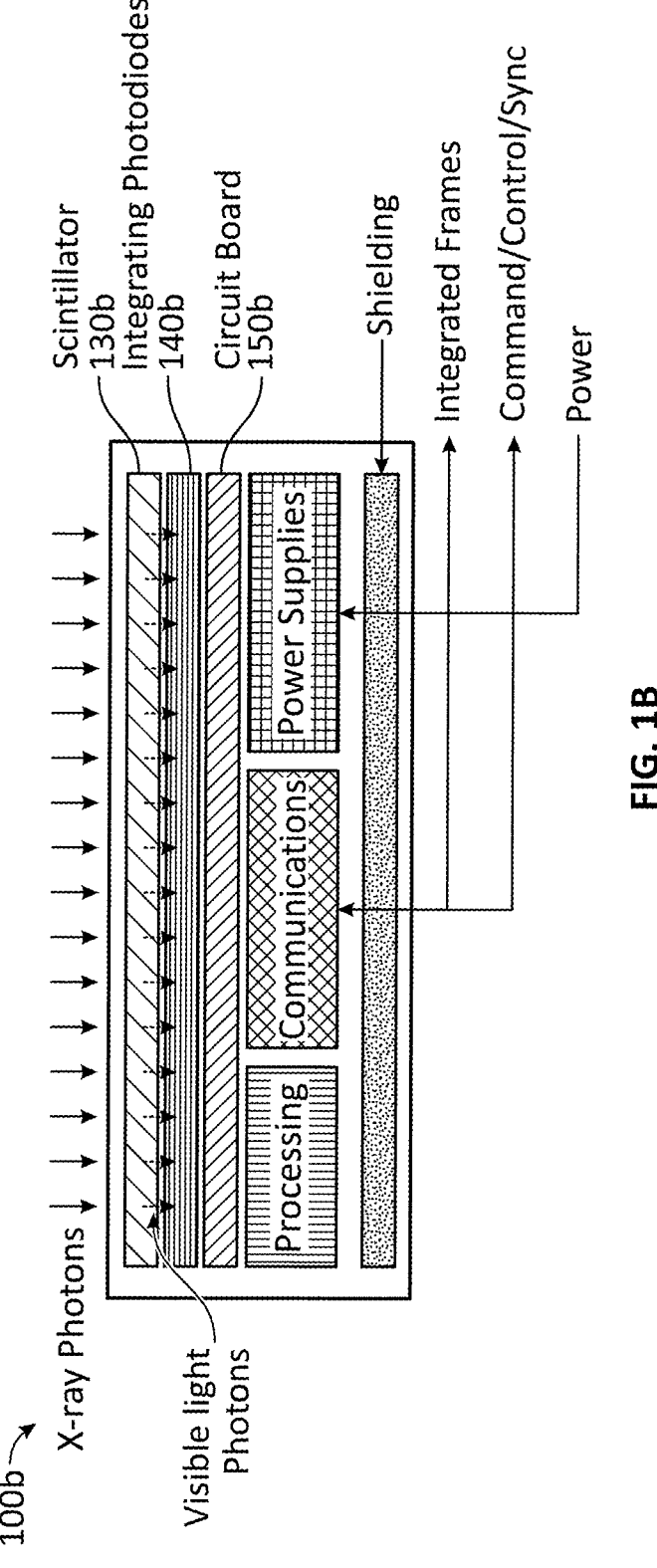

Integrating X-ray detectors use two basic types of detection for X-ray photons. FIGS. 1A and 1B respectively illustrate schematics of a direct integrating X-ray detector 100a and an indirect integrating X-ray detector 100b, in accordance with one or more embodiments. As illustrate in FIG. 1A, the direct integrating X-ray detector 100a can be used for direct detection where an X-ray photon is detected or "captured" in a material 110a, e.g., direct detection material, such as Selenium, and the photon is directly converted into electron/hole pairs. These electrons/holes travel through the material until being "detected" by an array of electrodes, e.g., charge detection board 120a, resulting in a charge that is proportional to the X-ray photon energy. The electric charge is integrated over time before the resultant charge is measured by the detector.

FIG. 1B illustrates a schematic of the indirect integrating X-ray detector 100b, in accordance with one or more embodiments. With the detector 100b, an X-ray photon is absorbed in a scintillator layer 130b, and visible light photons are produced. The visible light photons are then absorbed and converted to charge by an array of photodiodes (integrating photodiodes) 140b. The charge generated by these visible light photons is integrated over time and measured by the electronic circuitry (circuit board) 150b of the detector 100b, as illustrated in FIG. 1B.

An advantage of both direct and indirect X-ray imaging technologies is that they are similar to the technologies used to make photographic cameras. The construction of the X-ray detector leverages the knowledge from visible light cameras for both still and video photography. The disadvantages of the integrating detector may include a limit on the rate at which all the pixels in the array can be read out (this translates into a "frames per second" or "fps" metric), a minimum detectability limit based on the noise floor of the device, and a saturation limit based on the maximum charge a pixel can store.

Figures 2A, 2B:
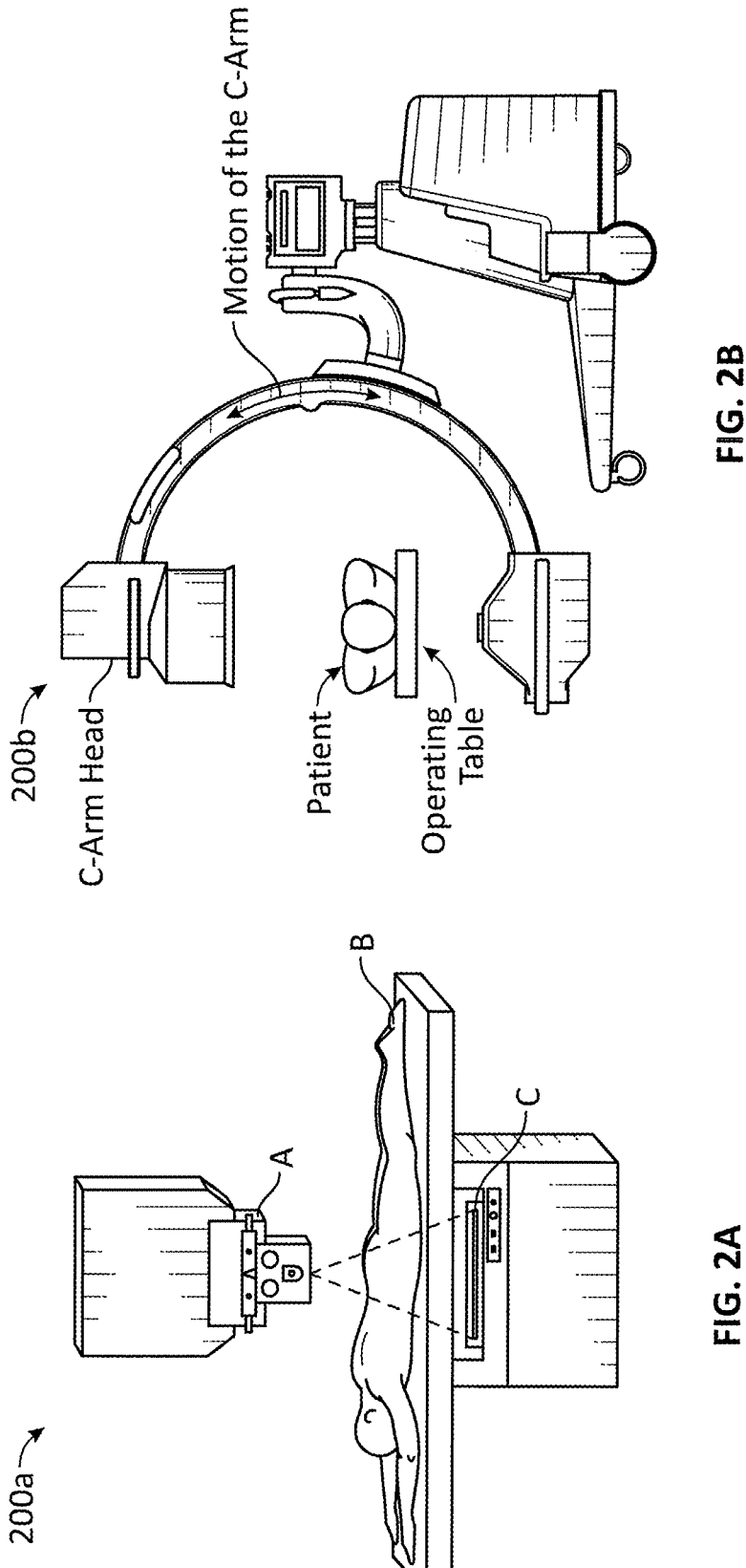
FIGS. 2A and 2B respectively illustrate schematics of X-ray Imaging systems.

FIGS. 2A and 2B respectively illustrate schematics of X-ray Imaging systems 200a and 200b. In medical applications, for example, X-ray imaging may take several forms. The first, Diagnostic Radiography (DR), is a modality that is used most frequently in a clinical setting. In this application, the X-ray source exposes a specific portion of the body to radiation and a detection method, film or digital, records the radiation profile generated by the passage of X-rays attenuated through the object. DR produces a still image, meaning a single frame of data is captured as a result of the integration of X-ray photons over time, as illustrated in FIG. 2A.

In another form of X-ray imaging used in applications, such as, in surgery or interventional, etc., a continuous low level of X-ray radiation can be employed to generate a sequential series of integrated frames. Known as "Fluoro" or "fluoroscopic imaging", this application can be used to observe movement of anatomy, i.e., to image a scene which changes with time. Fluoro frame rates can vary between 1 or 2 frames per second to (typically) 15-30 frames per second. In specific Fluoro applications, e.g., pediatric heart, high speed imaging of a small region of interest (ROI) is needed. On the other hand, the Cine application (also called "boost" or "record") is a high-power X-ray imaging mode designed to penetrate the chest and create stroboscopic images of the heart or other high-speed objects. This mode can be used specifically in cardiology to image heart anatomy and, together with the use of contrast agents, the flow of blood in the vascular system. Like Fluoro, the frame rates achieved by this application vary, but 15-30 fps is a typical range.

All applications mentioned above require a powerful X-ray source capable of producing X-ray photons of sufficient energy to penetrate a body and to maintain this photon flux for sufficient time to form an acceptable quality image. Increasing the number of photons reaching the detector comes with an increase in the amount of X-ray energy that is absorbed in the object ("absorbed dose"). Because X-ray radiation is a form of ionizing radiation and is known to be capable of causing cancers to living organisms, dose cannot be maximized to deliver the best image quality. Instead, it is optimized for the application within regulatory limits determined by the FDA (or other regulatory bodies). This is particularly true when using applications like Fluoro and Cine that utilize X-rays over extended periods of time, at exceptionally high power, or both. X-ray systems designed today require the use of high-power X-ray generators capable of extremely short pulses to meet the requirements of Cine and Fluoro applications. This is analogous to the use of a flash in visible light photography. The main difference is that it is quite difficult and expensive to create a "flash" X-ray source. The X-ray source needed for DR is significantly less complex and, correspondingly, less expensive.

When imaging under low x-ray flux conditions, the inherent noise of an integrating detector may limit the detectability. This can be the case, for example, when imaging highly attenuating objects. Optimizing the signal-to-noise ratio (SNR) can be achieved using techniques like temporal averaging and noise suppression without increasing the dose beyond the regulatory limits or exposing the patient over a longer period.

Figures 3A, 3B:
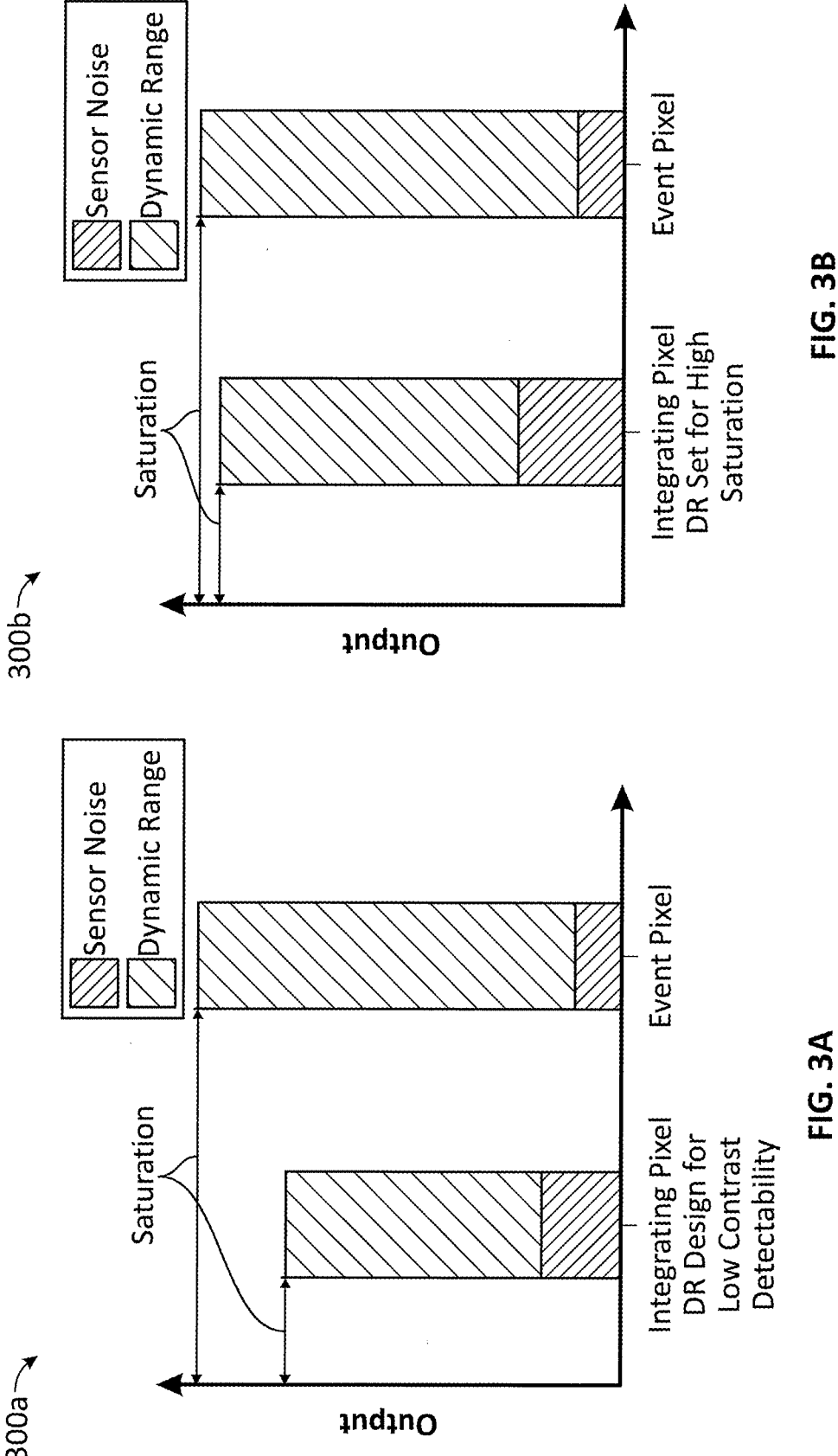
FIGS. 3A and 3B show plots illustrating saturation in integrating pixels versus Event camera pixels.

Imaging under high-flux conditions is also a challenge where it can lead to pixel saturation. FIGS. 3A and 3B show plots 300a and 300b illustrating saturation in integrating pixels versus Event camera pixels. For example, at saturation, a pixel can no longer respond to additional photon flux. In an integrating pixel, saturation charge is defined as the maximum amount of charge the pixel can accommodate. Although this saturation limit can be made larger by design, other performance aspects including the noise level may be compromised as the saturation charge limit increases, requiring the designer to optimize the charge capacity range for the specific application. An imaging technique combining low photon flux sensitivity, high saturation limit, and the capability for rapid detection of motion in the image would solve these common X-ray imaging problems and reduce the complexity and costs of the X-ray source and the imaging system.

Figure 4:
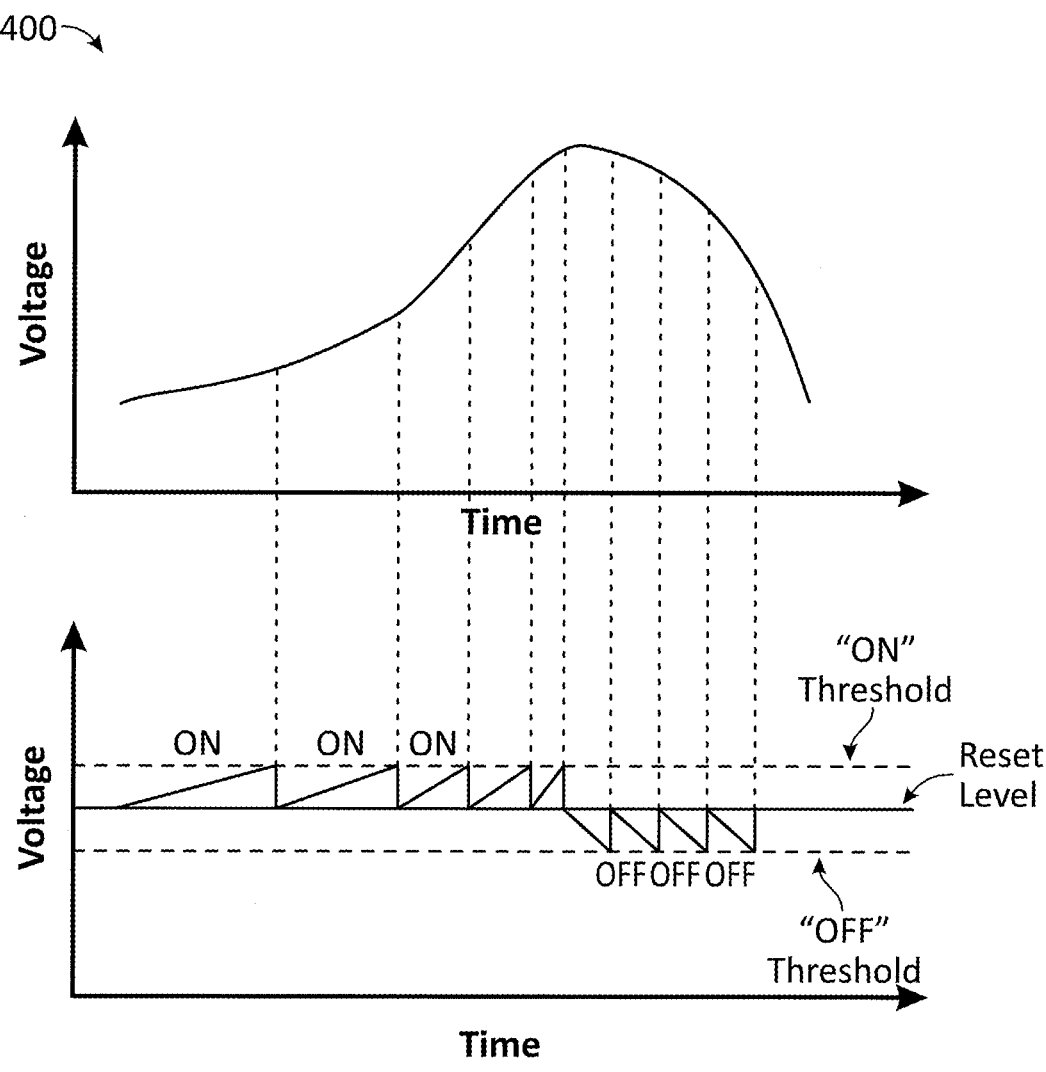
FIG. 4 illustrates a performance plot of neuromorphic pixels, in accordance with one or more embodiments.

FIG. 4 illustrates a performance plot 400 of neuromorphic pixels, in accordance with one or more embodiments. For example, an event camera, a neuromorphic imaging device, is a camera technology that responds to changes in light intensity on a pixel-by-pixel basis. It is asynchronous, as each individual pixel independently responds to light intensity changes and forwards the change as an event with a time stamp to the camera processor. This type of imaging is analogous to the imaging performed by the eye, such that it is highly sensitive to changes in intensity, and it sends data to the nervous system when a change is detected.

As a result, an advantage of neuromorphic imaging is that it dramatically decreases the volume of data required to update an image, in accordance with the embodiments disclosed herein. It is also uniquely sensitive to minute changes in intensity and facilitates the creation of subsequent image frames based on data from individual or groups of pixels.

As disclosed herein, neuromorphic imaging is also advantageous in applications with low light levels or where high dynamic range is required. This situation may occur in autonomous automotive applications, robotics, and other applications where a continuously updated full frame image is not required, but sensitivity to low intensity change is a key feature. This combination of high sensitivity and fast response enables the detection of motion in a variety of challenging environmental situations. The neuromorphic imaging system described in this disclosure is an X-ray imaging system which may be used in a variety of applications. Example applications may include, but not limited to, for example, non-destructive industrial testing, scientific imaging, security imaging, food inspection, and medical imaging. The non-limiting preferred embodiment described below is designed for use in medical applications.

In accordance with one or more embodiments, the individual pixels of a neuromorphic camera can operate asynchronously. The individual pixels are calibrated to respond to a specific change in intensity (or photon count) based on the threshold setting. The camera records the time at which this change occurred, sends the data to the processor along with the coordinates of the pixel and the polarity of the change, and resets for the next change in intensity.

This mode of operation of the neuromorphic pixel provides at least two benefits. In an integrating pixel the noise scales both with integration time and with charge handling capacity. The neuromorphic pixel may be tuned to detect intensity changes that occur below the integrating pixel noise level. The integrating pixel may be limited by the amount of charge it can accommodate. At saturation, the pixel can no longer respond to any additional photon flux. Neuromorphic pixels do not have this limitation, and thus, can respond to photon flux up to the limit of the power supply without a change in the noise level.

Figure 5:
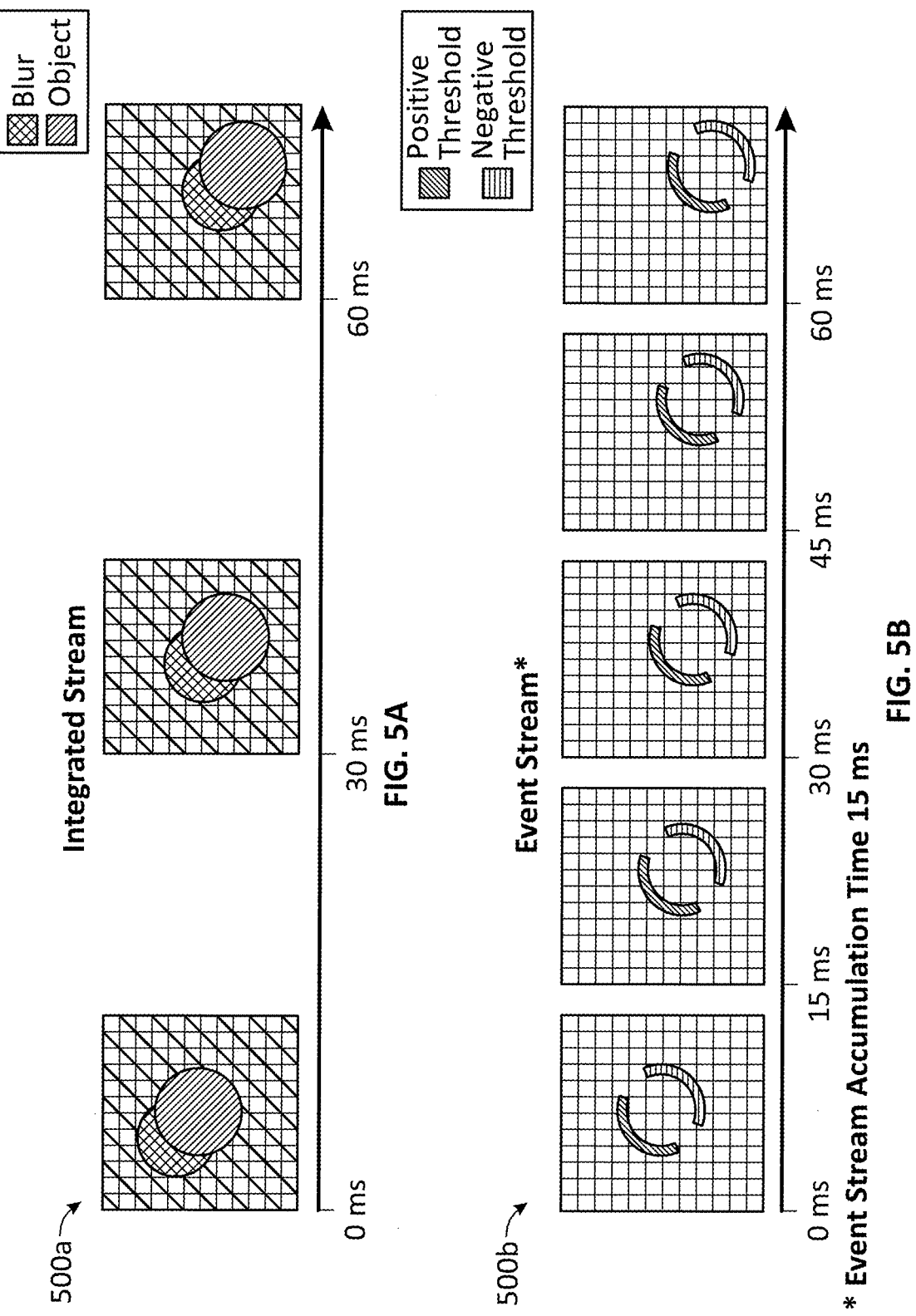
FIGS. 5A and 5B illustrate frame stream and event stream, respectively, in accordance with various embodiments.

Another advantage is in the individual time stamps of the intensity change. In an event camera stream, there are no frames, and there are only pixel events representing intensity changes occurring at arbitrary times. A host image processor, using a specified accumulation time or synthesized frame time, can extract that subset of pixels from the event stream which reported at least one intensity change during this time period. This pixel subset is then used to modify the image "frame". Current imaging is frame-based, so the changes presented by an event camera can be converted into "frames" which can then be utilized within an imaging system. FIGS. 5A and 5B illustrate frame stream 500*a* and event stream 500*b*, respectively, in accordance with various embodiments.

While this time stamp methodology allows for short accumulation times (corresponding to rapid frame rates), each subset of pixel events occurring within a given accumulation time does not correspond to a complete image frame, but only that portion of an image frame where motion or intensity changes occurred. Conventional imaging requires a method to combine the image changes with existing frames to create a fast, full-frame image stream. This hybridization process is best enabled by artificial intelligence algorithms trained to combine frame and event-based data. The result is high speed frame-based imaging enabled by event-based data.

Neuromorphic imaging is not without challenges. The first challenge is related to the neuromorphic thresholds. A neuromorphic camera typically contains millions of pixels. For the image to be uniform, each neuromorphic pixel records an event within a precise range of positive and negative thresholds. These thresholds should be programmable, uniform, and stable over time. The neuromorphic pixel circuitry compares the stored intensity value to the current intensity to determine if the current intensity exceeds the stored value by more than the positive or negative thresholds. If either of the thresholds is exceeded, an event is recorded, the current intensity value is stored and the neuromorphic pixel is reset for the next event. If the thresholds are set too low, the sensitivity of the pixel to intensity changes is increased but so is the sensitivity to noise.

The aforementioned increases the level of complexity of the electronics design. The electronics take space on the silicon to implement the design, reducing the amount of space dedicated to sensing the intensity change. The ratio of the light-sensitive photodiode area to that of the entire pixel is called "fill factor". Reducing the fill factor lowers the sensitivity of the pixel while increasing the fill factor limits the amount of silicon real estate for processing. The smaller the pixel, the more difficult this tradeoff becomes.

The speed criteria are also a challenge. To achieve high speed imaging, the pixel data can incorporate a precise time stamp and it can be reset rapidly enough to respond to the next change. The reset time can be considered a "dead time" during which the pixel cannot respond to a change, limiting the rate at which the pixel must respond to intensity changes. In addition to the speed for an individual pixel, the camera digital processing can respond and process all the pixels firing at approximately the same time. This type of situation occurs, for example, when there is an abrupt change in illumination level, resulting in intensity change recorded in all the neuromorphic pixels.

Another limitation of neuromorphic imaging is that it responds to intensity changes. Since the concept of imaging is frame-based, some method can be used to convert the changes represented by the event-based data into a series of frames. This can be done using the event data stream and synthesizing frames as previously described, but the resulting frames suffer from sparsity of data and substandard image quality compared to frame-based cameras. While this may be acceptable for some applications, the imaging for diagnostic X-rays cannot tolerate the loss of data and reduced image quality.

The event camera data can be used in two ways, for example, to extend the dynamic range of the initial frames and to create intermediate frames in between the integrated frames from the frame-based camera. Bringing these unique performance attributes to X-ray imaging offers a series of advantages to improve the clinical effectivity and the cost of current X-ray imaging systems. For example, in cardiology, the motion of the heart valves and the heart walls is rapid and, especially in pediatric applications, beyond the normal capability of the imaging system to stop motion without blur in the frame. Using the disclosed neuromorphic camera, the event camera pixels can be used to "deblur" the valves or other structures which experience high speed motion. Likewise, high-speed imaging can image the flow of contrast agents in the vascular system, helping to diagnose complex vascular disease in cardiology, neurology, and oncology.

The challenge of dynamic range in integrating X-ray imaging takes two forms. The first is the ability to distinguish low contrast objects next to high contrast objects. An example of this is the skin line where one side is raw X-ray beam, the other side is soft tissue. A second challenge is low dose Fluoro where the surgeon wants to minimize dose, but still see low contrast anatomy. This might take the form of visualizing tumors or other lesions in the breast or abdomen without contrast agents. The event camera can improve both scenarios by providing a higher sensitivity to attenuation variation in low density soft tissue.

There are two primary challenges when considering neuromorphic X-ray imaging. First, the dominant silicon-based technology used in X-ray detectors in applications of interest is not sufficiently capable of directly sensing X-ray photons. This limitation is handled in integrating detectors with the use of a scintillator screen. The scintillator screen converts X-ray photons into visible light photons which can then be efficiently absorbed and captured by a photodiode array to create an "image" of the scintillator light emission.

The disclosed neuromorphic X-ray camera can operate in the same way, receiving visible light photons from the scintillator screen and converting the changes in the screen intensity into an event stream. These changes are time-stamped and form the output stream of the neuromorphic detector. The scintillator screen must provide enough visible light photons when exposed to diagnostic X-ray levels for the pixels to respond to clinically relevant intensity changes. The response time of the scintillator must also be fast enough to display intensity changes at a rate which supports the desired imaging frame rate.

An alternate embodiment for a neuromorphic X-ray camera is to use direct detection technology. In this embodiment, X-ray photons are directly converted into electron/hole pairs within the sensor material (e.g., amorphous selenium or cadmium zinc telluride). In either direct or indirect detection embodiment, the X-ray detector pixels either integrate the charge generated by the photons or detect an event when the charge exceeds a threshold. In the case of indirect detection, both the photodiode and the associated electronic circuitry reside on the silicon, reducing the fill factor. In the case of direct detection, the fill factor is 100% for both the event and integrating pixel. As the electronic circuitry and space requirements are generally greater for the event pixel, direct detection provides particular benefit over indirect detection in improving the fill factor.

Figure 6:
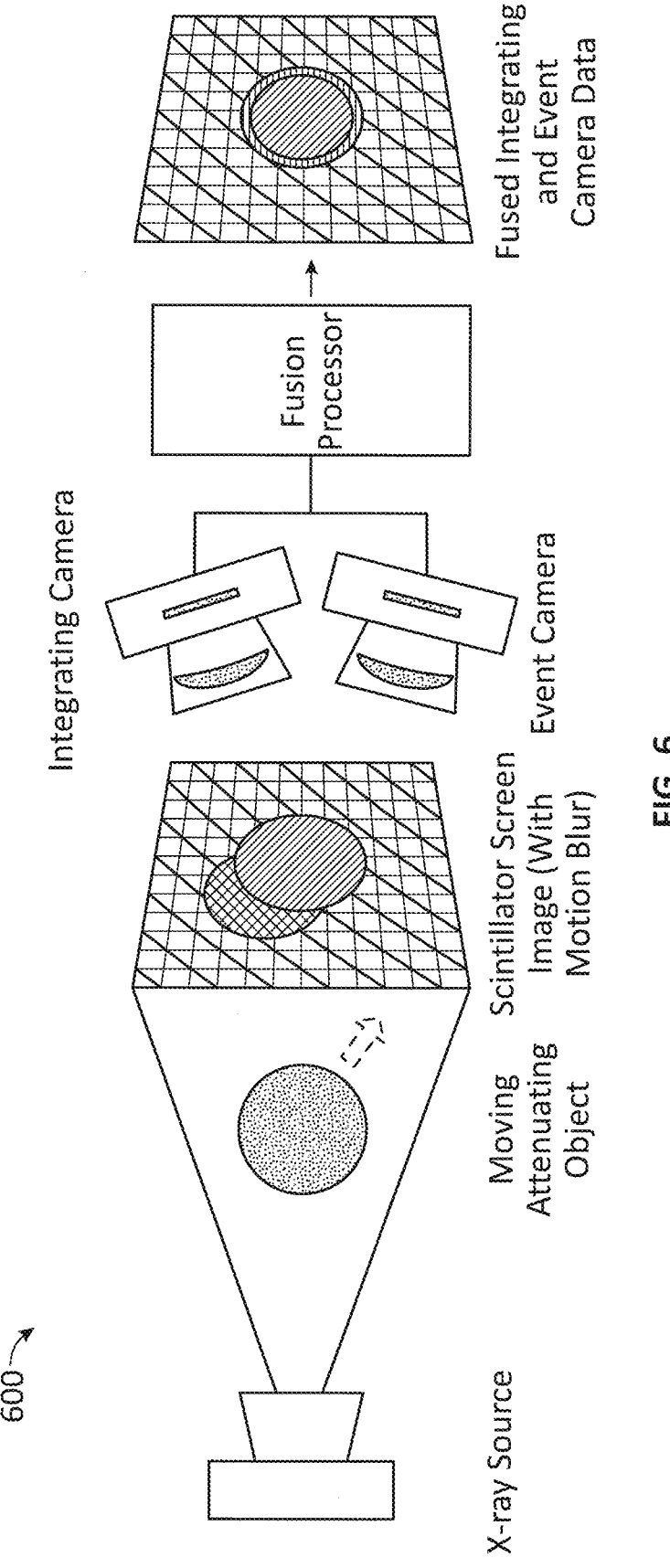
FIG. 6 illustrates a schematic of a dual-camera hybridization, in accordance with one or more embodiments.

The second primary challenge for neuromorphic x-ray imaging is to achieve a high resolution (and high dynamic range), frame-based image. Current X-ray imaging detectors are fundamentally frame-based devices, however, the event camera responds to intensity changes, leaving the formation of a high-resolution frame to downstream post-processing. FIG. 6 illustrates a schematic of a dual-camera hybridization, in accordance with one or more embodiments. An alternative to synthesizing frame-based images solely from event data is to reconstruct X-ray images from a combination of frame-based images and event data provided by two separate cameras, as depicted in schematic 600 of FIG. 6. Digital processing is then used to combine the output of the two cameras. The frame-based camera output can be considered a series of "keyframes," and the event data used to reconstruct intermediate frames based on the most recent keyframe. The processing to do this may use artificial intelligence to predict the effect of an event change on the surrounding pixels, thereby creating intermediate "frames" to effectively achieve a higher frame rate.

An alternative to using two separate cameras is to integrate the neuromorphic pixels into the integrating pixels of the X-ray detector. This single integrated or hybrid X-ray detector would then have the capability to deliver both integrated and event camera data.

There are several embodiments to consider when designing a hybrid neuromorphic X-ray detector. One embodiment is to design the entire detector to have only neuromorphic pixels. While this is possible, the design does not directly address the need for a high-resolution integrated image. It is possible to design pixels that can switch between integrating and neuromorphic modes. This embodiment provides high design flexibility in the detector, yet adds considerable cost and complexity. A third option, known as the Davis pixel, provides continuous output of integrated data and event data in parallel from every pixel.

The hybrid neuromorphic X-ray detector described herein is an X-ray detector based on the concepts of current integrating X-ray detectors with the addition of event camera pixels distributed throughout the integrating detector array. The method of this distribution is discussed in detail further below.

Combining the integrated data and the event data into a hybrid dataset is the challenge facing the system designer given the two datasets are completely different. Before combining them, either the event data must be converted into frames, or the frame data converted into events. Given that the desired output is likely to be frames, the former method of converting the event data into frames is desired.

Figure 7:
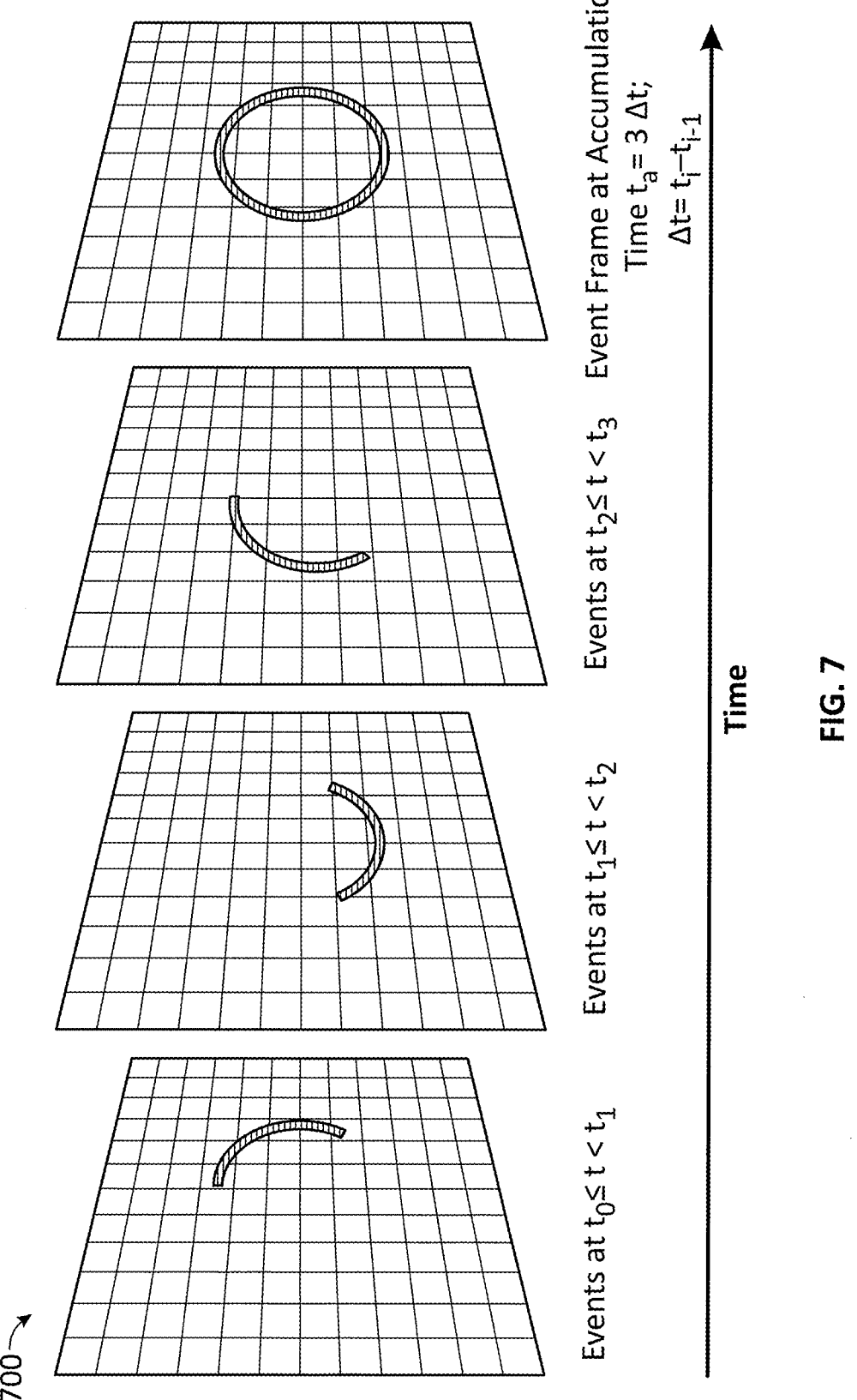
FIG. 7 illustrates different time frames based on neuromorphic pixel frame accumulation time, in accordance with one or more embodiments.

Combining the data sets first involves defining a fps target or accumulation time to be used to segregate the event data, in accordance with one or more embodiments. Applying this segregation will yield a series of "frames" which contain only the changes captured by the event camera within the accumulation time period. FIG. 7 illustrates different time frames 700 based on neuromorphic pixel frame accumulation time, in accordance with one or more embodiments. If the first frame is used after a keyframe or a frame-based image, the event frame data modifies pixels in the frame-based image by increasing or decreasing the intensity of the pixel based on the events recorded for that pixel during the accumulation time.

In some cases, there may be more than one event for a given pixel during the accumulation time and the change in intensity in the frame-based image may not be limited to only the pixels with defined changes, but also pixels adjacent to the changed pixels. Changes to be applied to these pixels can then be computed based on either deterministic algorithms or artificial intelligence (AI). The AI models are particularly suited to this type of "image painting", as the AI models can include one or more neural networks that have been trained on X-ray images to understand the way brightness change in one pixel or pixel area can be incorporated into an overall image frame.

This type of hybrid neuromorphic X-ray detector alters the requirements of the imaging system needed to create "blur-free" high speed images, in accordance with one or more embodiments. The neuromorphic pixels are essentially functioning as a high-speed shutter for the incident X-ray photons. Like the visible light camera, the X-ray neuromorphic detector does not need a flash, but only adequate illumination to detect light intensity changes. This change in requirements translates into a simpler X-ray generator which need not create high power, short pulses to freeze motion. With continuous lower intensity x-ray exposure, the neuromorphic pixels capture the motion as it occurs and the image processing creates frames with a high frame rate, freezing motion without the need of an X-ray "flash".

The design simplification possible with the hybrid neuromorphic X-ray detector provides both improved imaging characteristics with clinical value and a reduction in the complexity and cost of the X-ray imaging system.

In view of the aforementioned introductory description of the technologies disclosed herein, more in-depth details are discussed further below. As discussed above, neuromorphic technology as demonstrated in biological vision systems offers improvements in processing speed, data reduction, and dynamic range expansion. While these features are of evolutionary value in biology, their value in imaging may be of a similar importance. The disclosure described herein is concerned with the application of neuromorphic techniques to integrating X-ray detectors to improve the current imaging technology and reduce the cost of the current imaging systems.

Current digital X-ray detectors integrate charge generated directly or indirectly to form an image. This integration takes place over the time of the X-ray exposure, followed by readout of the generated charge from the detector array and creation of an image frame for display. The display can be either a single frame, often called a diagnostic image, or a series of time-based frames referred to as Fluoro or Cine.

Digital integrating X-ray detectors are limited by the rate at which they can read out a full frame and by the dynamic range they can achieve. The read-out time is a function of the speed of the detector electronics and the number of pixels that are read per frame. The dynamic range is limited by readout and dark noise, which limit the ultimate low-dose detectability, and by saturation dose, or the maximum intensity the detector can respond to before saturating.

When the integrating digital X-ray detector is used to create serial images, the X-ray source can function in two different modes, in accordance with one or more embodiments. The first is a pulsed mode where the X-ray source functions similarly to a flash in visual light imaging. The second mode uses continuous X-ray exposure. This latter mode requires the detector to read the frames rapidly or the image will suffer from motion blur artifacts.

In a neuromorphic X-ray detector, an imaging event is not triggered by a serial read of the pixels, but rather by an X-ray event causing a change in intensity (positive or negative) greater than a pre-defined value, in accordance with one or more embodiments. When this value is exceeded, the pixel reports the intensity change and the polarity together with a time stamp to the detector logic. Each neuromorphic pixel in the X-ray detector functions in this manner, creating a series of imaging events that represent change as a function of time.

In one or more embodiments, because the threshold is a pixel level charge detection, the detection of low-level signals can be affected by the level of electronic noise in the pixel depending on the threshold setting. The sensitivity to noise can be decreased by increasing the threshold, but at a cost of reduced sensitivity to signal changes. The neuromorphic pixel electronic noise level is not affected by the capacitance of data lines used to transfer charge to an A/D converter in an integrating pixel, in accordance with one or more embodiments.

Neuromorphic X-ray pixel saturation occurs when the reference value for a pixel exceeds the upper limit of the pixel design. At this point, the pixel cannot set an upper reference greater than the pre-defined value because this would exceed the value allowed by the pixel electronics and the power supplies. When this occurs, increasing intensity changes cannot be tracked and the pixel responds only to changes reducing the intensity.

The time stamps for the pixel events can be assembled into groups. These groups consist of a collection of pixel changes occurring within an accumulation time and can be used to reconstruct an image frame based only on these changes as illustrated in FIG. 7. The accumulation time is selected based on the rate of motion of the object visualized, creating an "optimum" frame rate that reduces the motion blur required for the application.

The high-speed operation of the neuromorphic X-ray detector effectively makes the detector a "shutter". In some embodiments, the speed of the shutter in a neuromorphic camera is fast enough that it can stop the motion blur present in current continuous X-ray imaging devices. This simplifies and reduces the cost of the X-ray source required for procedures where stop action is required.

A neuromorphic X-ray detector has excellent characteristics for use in X-ray imaging, but it has the drawback that it does not form a full frame image of diagnostic quality similar to the integrating detectors currently used in X-ray imaging. Likewise, today's integrating X-ray detectors suffer from slow readout times and limited dynamic range.

The combination of these two types of X-ray detectors offers a solution which can deliver the benefits of both. As disclosed herein, the hybrid neuromorphic X-ray detector has the capability to generate integrated frames of diagnostic quality, reconstructed frames based on X-ray events happening at high speed, and a dynamic range superior to that of the integrating detector. In addition to the improvement in imaging, the design of the system capable of using this detector is simplified, reducing cost and complexity.

In accordance with one or more embodiments, the disclosed hybrid neuromorphic X-ray detector includes a pixel matrix composed of two types of pixels, namely, integrating pixels similar to the pixel design in current X-ray detectors, and event-based pixels similar to the event-based pixels found in event cameras currently available. However, the two types of pixels can be distributed in the hybrid neuromorphic X-ray detector in a number of different ways.

Figures 8A, 8B, 8C:
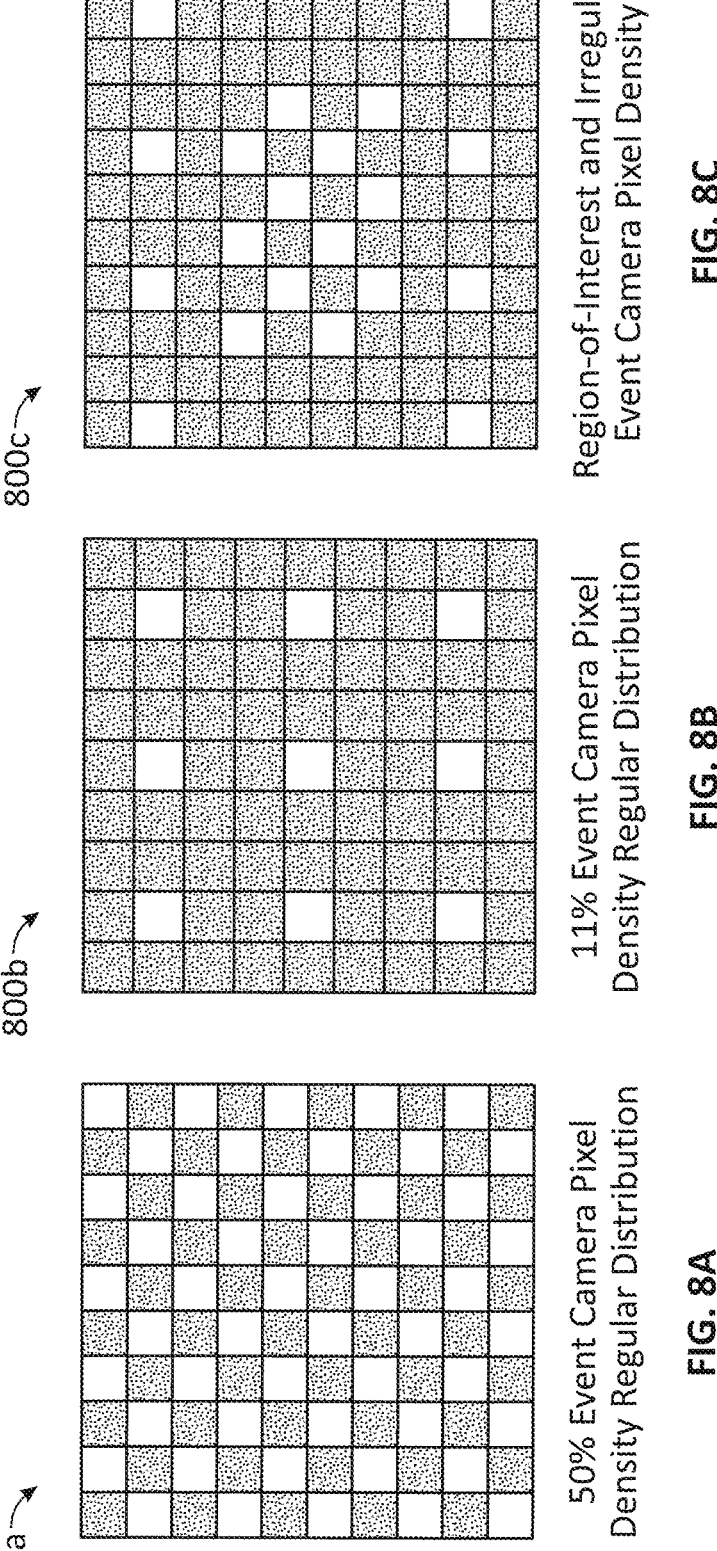
FIGS. 8A, 8B, and 8C depict various sub-aperture arrangements of pixels of a hybrid neuromorphic X-ray detector, in accordance with one or more embodiments.

FIGS. 8A, 8B, and 8C depict various sub-aperture arrangements 800a, 800b, and 800c, respectively, of pixels of a hybrid neuromorphic X-ray detector, in accordance with one or more embodiments. The distribution of the event camera pixels within the integrating detector is called a sub-aperture. The sub-aperture may be, for example, a single block of pixels, a random distribution, or a periodic distribution within the integrating pixel matrix array.

The design of the sub-aperture is guided by the specific application for which the detector is designed. For example, a block of neuromorphic pixels may form a high-resolution image at a specific location, enabling high-speed imaging of a specific anatomic feature (e.g., pediatric heart). However, all sub-apertures or sub-aperture configurations can consider several design parameters, including, for example but not limited to pixel size, pixel count, geometric distribution, fill factor, and the ratio of integrating to neuromorphic (also referred to herein as "event-based") pixels.

In various embodiments, the size of the neuromorphic pixels are equal to or substantially equal to the size of the integrating pixels. In some embodiments, the size of the neuromorphic pixels are different from the size of the integrating pixels. Depending on the event processing and image reconstruction strategy, neuromorphic pixels may be designed to be different in size from integrating pixels.

The neuromorphic pixel count is a tradeoff that can be included in the consideration for the resolution of the integrating image as well as that of the event camera image. At a neuromorphic pixel count of 50%, the resolution of the two cameras will be the same. This ratio may simplify the imaging system data processing for specific applications. In some embodiments, the event camera can have the same physical resolution as that of the integrating camera, as illustrated in FIGS. 8A, 8B, and 8C.

Also as shown in FIGS. 8A, 8B, and 8C, the geometric distribution or arrangement of the pixels can be a tradeoff, or varied. A logical pixel distribution to achieve neuromorphic imaging throughout the entire detector would be a periodic distribution. This may take the form, for example, of one neuromorphic pixel for every four integrating pixels (in both rows and columns of the integrating pixels). This would be a 1:15 ratio of neuromorphic to integrating pixels. As with the other design parameters, it is the application for which the hybrid neuromorphic X-ray detector is designed that will dictate these tradeoffs. See FIGS. 8A, 8B, and 8C.

The hybrid neuromorphic X-ray detector may be considered as consisting of two sub-apertures delivering two different types of imaging data to a central processor. In one embodiment of the invention, these sub-apertures function in parallel, providing continuous digital output. The integrating sub-aperture functions similarly to existing X-ray imaging detectors, providing frame-based data on a periodic basis (keyframes). The keyframe period is adjustable based on the application requirements, in accordance with some embodiments.

The neuromorphic sub-aperture may also function continuously, delivering time-stamped event data to the central processor in an asynchronous stream. If there is no change in the X-ray intensity, then there will be no data in the neuromorphic data stream. In fluoroscopic medical imaging, for example, unless there is anatomic or procedural-based motion (e.g., devices like catheters or surgical tools), there will be little or no neuromorphic data stream.

In an alternate embodiment, if the neuromorphic pixels are capable of both integration and event-based detection, they may transmit integration and event data in parallel to the processor. In another embodiment, the pixels may be switchable between integrating and neuromorphic operation. In this case the central processor selects the mode of operation, thereby defining different neuromorphic sub-apertures based on the imaging application.

In various embodiments, the core technology in hybrid neuromorphic X-ray imaging is the hybrid X-ray detector. The detector establishes the basic data streams corresponding to keyframes and the neuromorphic data. The success of the innovation must then depend on the fusion of these two types of data into a single image for display and/or interpretation. In some embodiments, the concept of the integration-based image has already been discussed, but there is one other aspect of integration-based imaging.

Figures 9A, 9B:
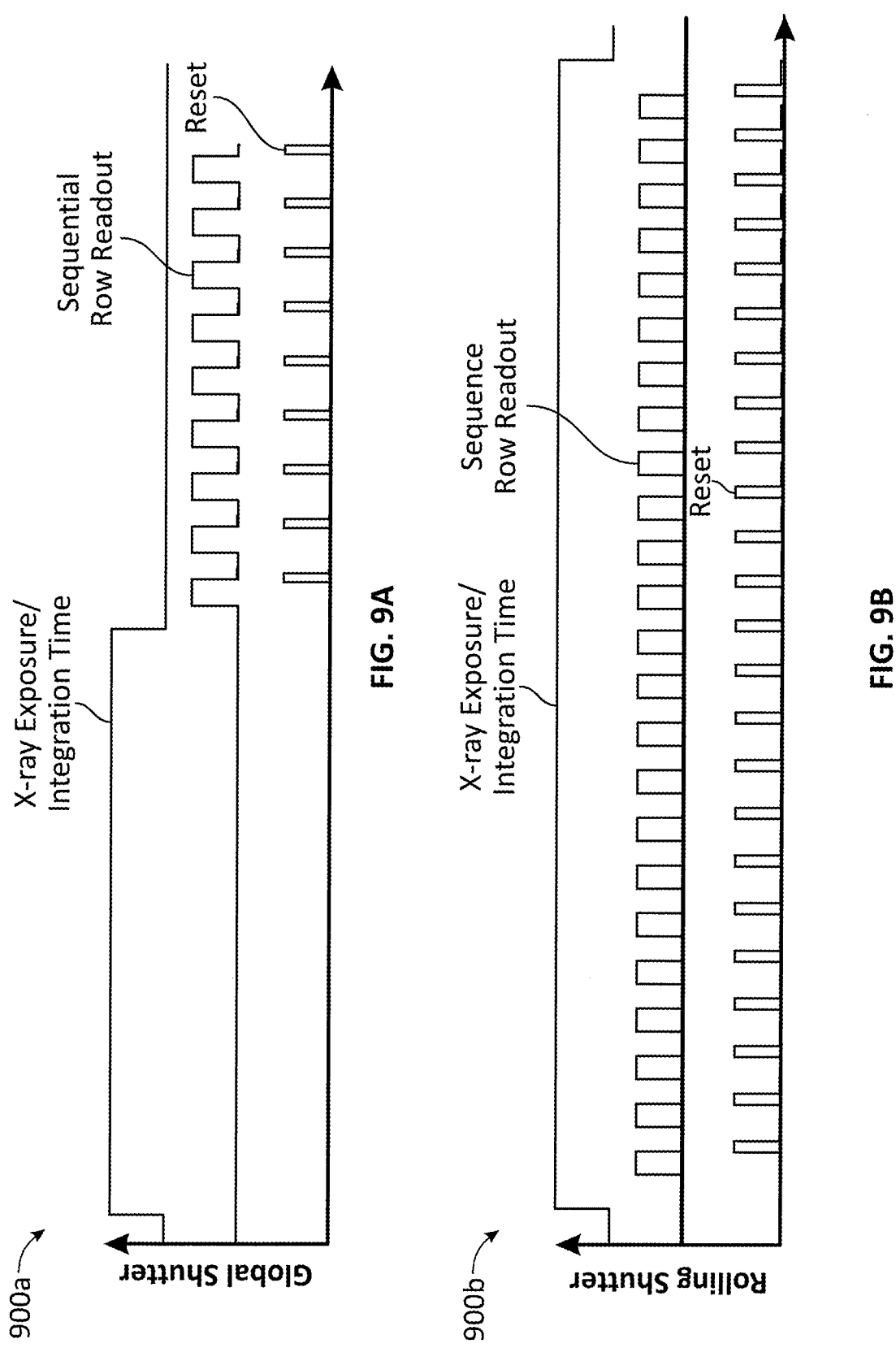
FIGS. 9A and 9B illustrate global shutter and rolling shutter, respectively, in accordance with one or more embodiments.

The readout of an integration-based detector can take two forms, wherein the first is a technique called a "global shutter", and the second a technique called a "rolling shutter". FIGS. 9A and 9B illustrate global shutter 900a and rolling shutter 900b, respectively, in accordance with one or more embodiments.

As the name implies, a global shutter 900a performs a readout of the pixel intensity values over the whole array, followed by a reset, before starting integration again. This functionality is accompanied by operating the X-ray source in a pulsed or "strobed" mode, with pixel array readout beginning after x-ray exposure ends. All pixels will have an integration time equal (at least) to the duration of the X-ray pulse. The resulting image will contain motion artifacts created by object motion that occurs during the x-ray exposure. In some embodiments, the pixels can be reset after the read operation, but exactly how and when this occurs is an element of the design. If a reset is done globally after the global shutter read and the source is a continuous X-ray source, data will be lost due to the integration which occurs after the read but before the reset. This is not an issue with a pulsed X-ray source, where the readout and reset occur in-between x-ray exposures.

In contrast, the rolling shutter 900b, as implied by the name, is a method where the pixels are continuously read on a row-by-row basis. In this design, the readout time is distributed by row and integration of x-ray signal continues in the rest of the detector while the readout of each row occurs. However, the integration periods for each row do not coincide, leading to staggered integration times between adjacent rows.

The neuromorphic data stream is a continuous flow of event data generated during illumination by the X-ray source. Because of the two different forms of X-ray illumination, pulsed or continuous, the effect of X-ray illumination on the data stream can be considered.

Continuous X-ray exposure of the neuromorphic pixels is straightforward. The neuromorphic data stream will record the initial startup of the X-ray exposure with all detector neuromorphic pixels recording an event. This "startup transient" is predictable based on the timing of the X-ray illumination and can be eliminated if desired. Given a fast enough neuromorphic pixel response time, it may be possible to record the rise and fall time of the X-ray illumination. Once the startup phase has concluded and the X-ray illumination achieves a steady state, the neuromorphic sub-aperture will respond only to changes in the detected X-ray intensity.

In a pulsed X-ray exposure, the neuromorphic data stream is more complicated. In this case, the "startup transient" occurs at the start of every X-ray exposure. As in the continuous exposure scenario, the startup phase will be recorded, but can be eliminated if desired based on knowledge of the X-ray pulse timing. However, subsequent neuromorphic data acquisition can only occur during X-ray illumination. This results in neuromorphic data which can be used to create intermediate frames, but the number of frames is determined by the accumulation time and the X-ray pulse period. While possible to design a neuromorphic imaging mode with a pulsed X-ray source, continuous X-ray illumination is the best option for a neuromorphic imager.

The foundation of hybrid neuromorphic X-ray imaging is the integration-based image frames. Called "keyframes", these images form the backbone of the image stream provided by the detector. It is the integration-based images that define the basic image quality of the X-ray image stream. This means the fundamental resolution, contrast detectability, field of view, and macro motion are all determined by the integration-based image stream.

The keyframes are also the starting point for any modifications introduced by the fusion of the neuromorphic data stream. The hybrid image is based on the concept that the neuromorphic data is used to improve the visualization of high-speed motion and the detection of objects or motion which are not clearly observable in the integration-based images due to limited dynamic range, motion artifacts, or noise.

Figure 10:
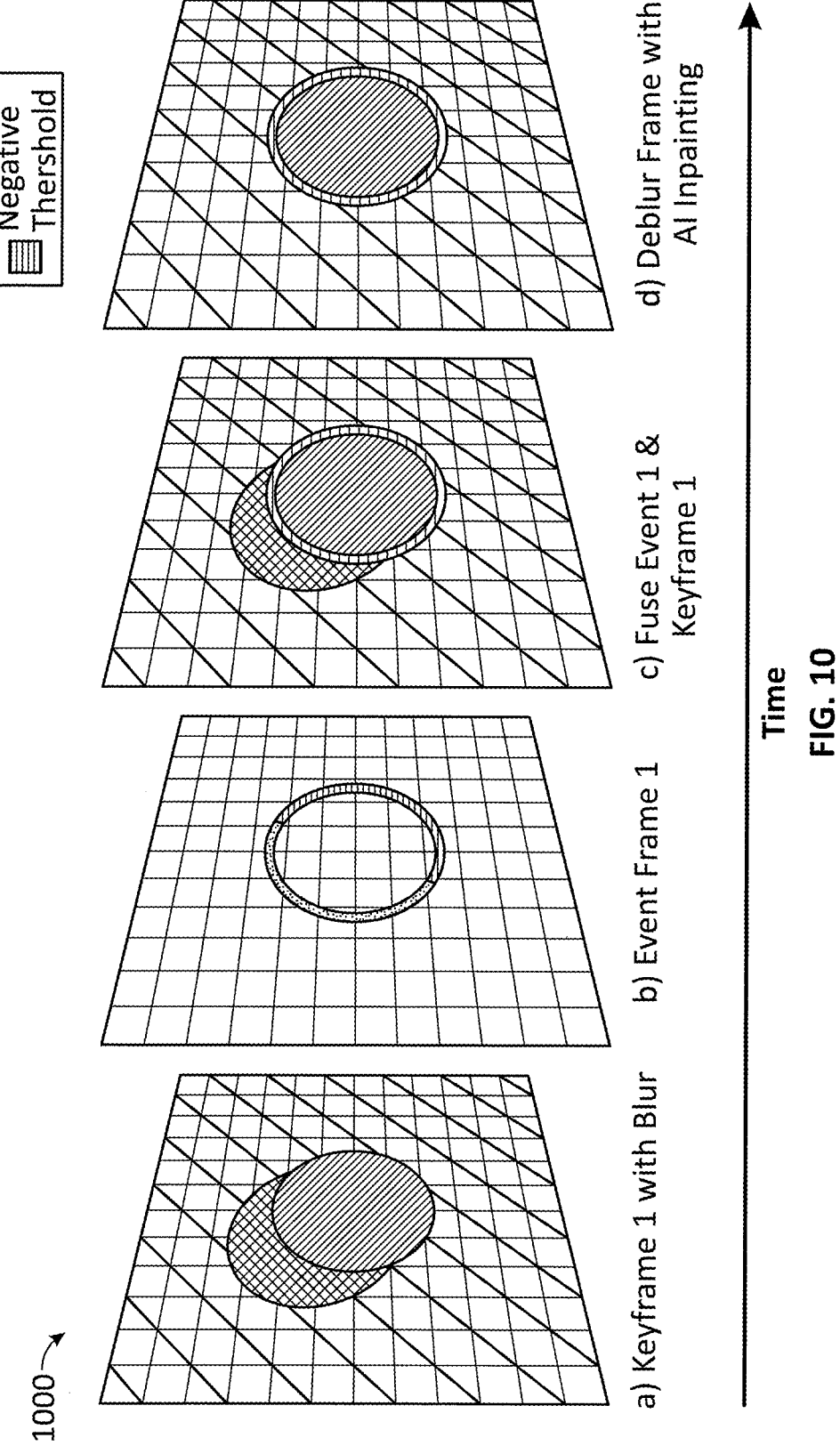
FIG. 10 illustrates a process of deblurring keyframes in real-time, in accordance with one or more embodiments.

Each pixel within the integrating sub-aperture is integrating X-ray exposure over a frame period. Integration produces three effects: the first effect results in "smearing" or "blurring" of motion that may have occurred during the frame period. As objects move the attenuation produced by the moving object is spread over multiple pixels. The motion results in blur as the location of the object is not restricted to a specific point on the detector but is mapped to a series of locations. FIG. 10 illustrates a process 1000 of deblurring keyframes in real-time, in accordance with one or more embodiments.

The second effect is the masking of low contrast objects by the detector noise or saturation limits. This is due to the restricted dynamic range imposed by the limits of noise and saturation level in an integrating pixel. This limits detectability of low contrast objects, particularly when the objects are located near a high contrast object. These limits may mask intensity changes that are important to the specific application.

The third effect is an averaging of the X-ray intensity over the integration time. In the case of no motion, this may improve the image quality by increasing the amount of signal relative to the noise.

The first two integration effects are detrimental to the overall image quality, creating motion artifacts and reducing the visibility of low intensity signals. However, in the hybrid neuromorphic detector, there is an event stream acquired in parallel which does not suffer from the same limitations found in the integrating pixels. The challenge is to combine the neuromorphic and integrated data streams to form a single image stream for visualization.

There are two options to create this hybridization. The neuromorphic data can be used to define the edges of objects that are in motion and blurred in the keyframe. By applying this edge definition in the keyframe, the blur caused by the motion during the integration may be removed. Essentially, this is a process by which the "correct" edges of an object in motion are clearly defined in the keyframe. See FIG. 10. The deblurred keyframe is displayed and the subsequent keyframe is processed for deblurring. This hybridization method creates real-time deblurred images at a frame rate normally used for integration imaging.

Figure 11:
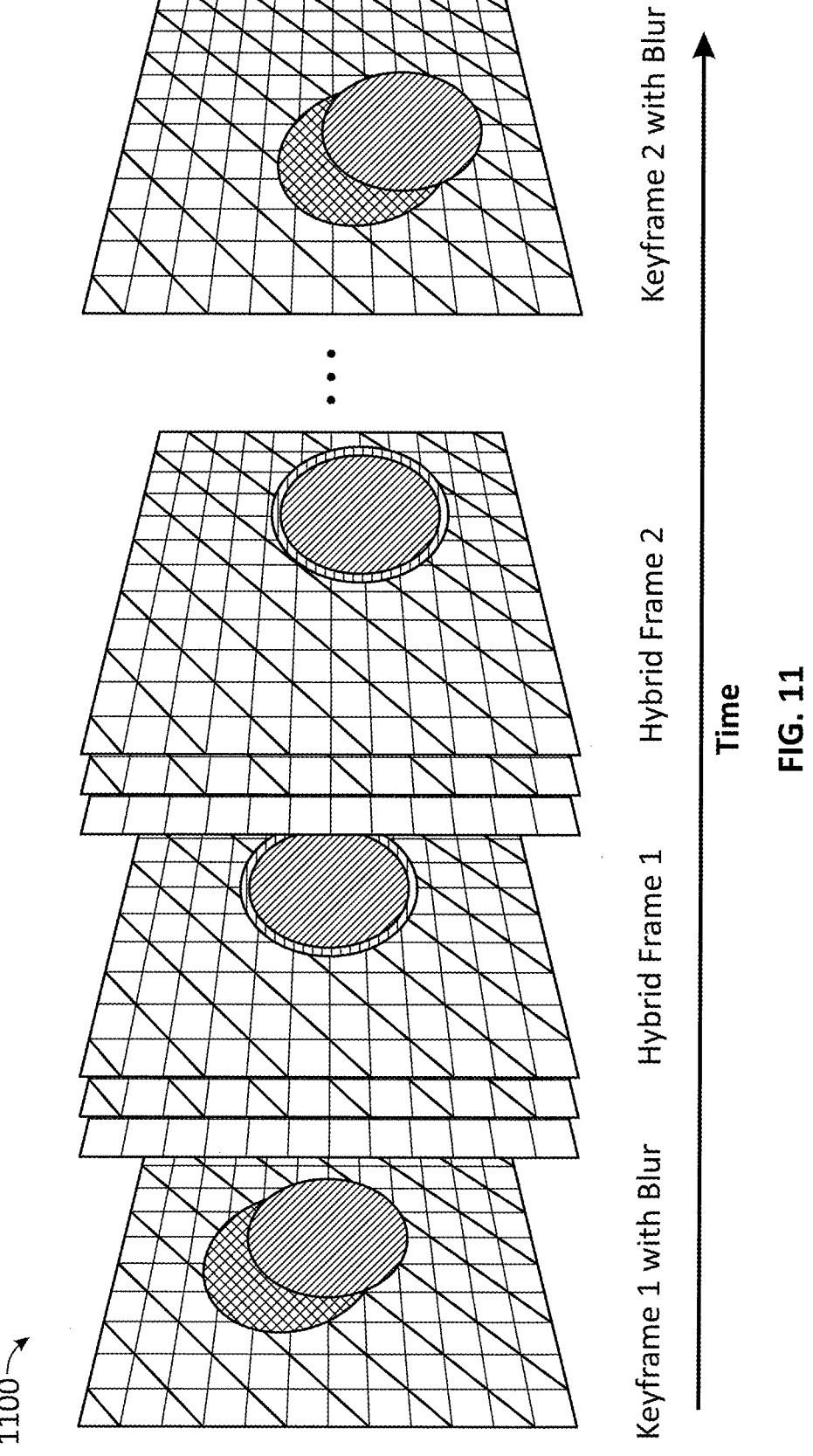
FIG. 11 illustrates a process of high-speed hybridization of the imaging streams, in accordance with one or more embodiments.

A second hybridization method is to use the neuromorphic data to build a high-speed sequence of frames. While the process of combining the keyframe and event data described previously is the same, the accumulation time may be very short, resulting in a modification to the keyframe that corresponds to a time much less than that of the integration time. This corrected keyframe then becomes the next keyframe and the process is repeated. Because the accumulation time is short, a number of new frames are formed within the integration keyframe period, creating a high-speed data stream. FIG. 11 illustrates a process 1100 of high-speed hybridization of the imaging streams, in accordance with one or more embodiments.

In both types of hybridization, the hybrid frames subsequently continue with modifications based on the neuromorphic data. This creates a frame-based series of images where the motion (including the detection of motion in low contrast objects) is added to the frames on a periodic basis.

These hybridization methods may not completely eliminate all motion artifacts. While the motion artifacts in integrating pixels are controlled by the frame time, there is also a short integration time associated with event pixels. However, the neuromorphic pixel integration time is significantly shorter than that of the integrating pixel, minimizing motion artifacts in the final image sequence. The selection of the accumulation time is analogous to selecting the shutter speed on a photographic camera. Increasing the shutter speed does not completely eliminate motion artifacts, but they are progressively reduced as the shutter speed is increased.

While the neuromorphic data stream provides data to modify the keyframes (and intermediate frames) based on intensity changes, it does not provide any data concerning keyframe pixels which are not associated with the change detected by the neuromorphic pixels. For example, in the case of an object moving through a series of pixels in the integration-based keyframe, the object may create a blur in a group of integration pixels due to its motion and the corresponding change in intensity detected during the integration period. By fusing the neuromorphic data of this object with the keyframe, deblurring of the object in the keyframe may be accomplished. However, deblurring may include two processing steps, with a first step to define the actual location of the object, and the second to replace the area of blur around the actual object location with data representative of the background.

To merge the event data with the keyframes, a method to "level match" is needed. This may be done based on an average intensity in the keyframe pixels adjacent to the event, or it may be part of the generative AI inpainting in this area. With appropriate level matching and pixel corrections, the event data can be incorporated into the keyframe at the appropriate pixel locations defined by the physical construction of the detector.

As event data are incorporated into the keyframe, this effectively removes a portion of the "blur" created by the integration in the keyframe pixels. The event data corresponds to an intensity change in a time-slice much smaller than the integration time of the frame-based pixel, therefore the event data forms the basis of an image at a higher frame rate.

However, incorporating this data into the frame-based data creates another problem. The objects that were originally blurred are now localized and the blurred areas must be replaced with "image data" representative of the area with the blurred object removed. Replacing this data can be done deterministically in a manner similar to defective pixel correction, assuming the area contains few pixels. However, if it is larger, an alternative is required.

In accordance with some embodiments, artificial intelligence ("AI") algorithms provide an alternative to the computational algorithm approach. Generative AI algorithms used for "inpainting" can be trained to fill in missing detail in images, based on learning from thousands of visual images. By training the inpainting generative AI algorithm on X-ray images (perhaps separately for different applications), it can be used to replace the blur with appropriate image data based on the anatomy surrounding the area to be filled. In inpainting data used to reduce blur may or may not be diagnostic, depending on the requirements of the application and the clinical validation of the images. As fluoroscopic imaging is usually not diagnostic but rather is used for surgical guidance, the clinical value of the image is limited.

With the combination of the two data streams, keyframes, the fusion process, and the artificial intelligence inpainting, a high-speed, frame-based image sequence may be obtained. The frame rate may be changed based on the accumulation time used for the neuromorphic data, but the overall image quality is controlled by the keyframes.

The capability of the system to generate high frame rates can vastly exceed what can be visualized by a human in real time. To view all data frames, it may be necessary to create a "slow motion" frame series which can be replayed after the acquisition.

For data streams that must be shown in real-time (e.g., fluoroscopic guidance), the corrected keyframes may be the only frames passed on to the imaging system for display. In this case, the neuromorphic data is used to correct only the keyframes and may not generate additional intermediate frames.

The hybrid neuromorphic X-ray detector is a high-speed video camera for X-rays. It is analogous to a high-speed video camera functioning under continuous lighting. In this case, the lighting is a continuous X-ray source. While the options for using a pulsed X-ray source have been discussed, the preferred embodiment utilizes a continuous X-ray source and uses the hybrid neuromorphic X-ray detector as a variable speed shutter.

The advantages of the hybrid neuromorphic X-ray imaging system are in the detectability of rapid and/or low-level intensity changes. This is applicable in clinical situations where there is rapid motion, potentially at a low level of detectability. This situation is found in vascular and cardiac imaging in adults and children. Imaging of the heart requires a rapid shutter setting to capture the motion of the valves and the heart walls without blurring.

The dynamic range of the hybrid neuromorphic X-ray detector improves the ability of the imaging system to distinguish low contrast objects next to high contrast objects. An example of this is the skin line where one side is raw X-ray beam, the other side is soft tissue. Imaging next to bones is a similar challenge. Fracture visualization, implant healing and longevity, and tumor localization are all examples of imaging tasks which require high dynamic range in the presence of a high contrast object.

Another application advantage is in the imaging of blood flow with contrast agent. The flow of contrast agent in the blood stream can be imaged with the hybrid neuromorphic X-ray system, removing the blurring of the contrast trajectory in the blood stream, particularly at bifurcations or in the vicinity of stenoses. With a better understanding of the precise blood flow in the brain, liver, extremities, or cardiac arteries, the most effective therapy may be selected.

Additional advantages of the hybrid neuromorphic X-ray detector relate to the system design and cost. If the detector can perform as a shutter without losing image quality due to short integration times, the imaging system does not need a pulsed X-ray generator and X-ray source. In Interventional imaging systems, the hardware and software required to generate the high power, short X-ray pulses comprise a significant portion of the cost of the system. Simplifying the system design with a continuous X-ray source saves significant cost.

Figure 12:
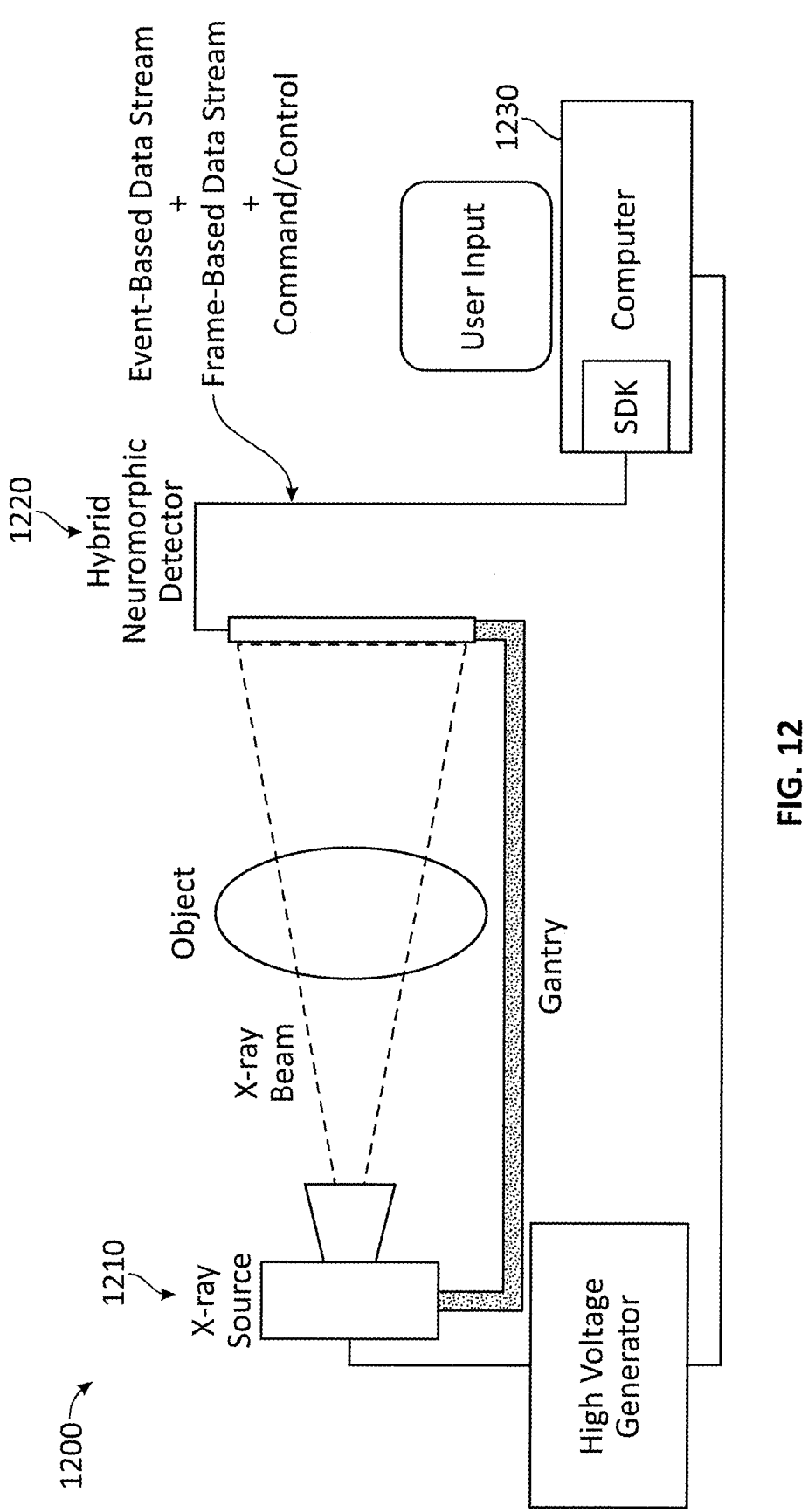
FIG. 12 illustrates an example hybrid neuromorphic X-ray imaging system, in accordance with various embodiments.

FIG. 12 illustrates an example hybrid neuromorphic X-ray imaging system 1200, in accordance with various embodiments. As illustrated in FIG. 12, the hybrid neuromorphic X-ray imaging system 1200 includes an X-ray source 1210, a hybrid neuromorphic X-ray detector 1220, means to transmit the data to a computer system, and a computer system (also referred to herein as "a processor") 1230, which may contain a user interface, display, and hosts a software development kit (SDK) that processes the data from the detector to create the image sequence displayed on the computer monitor. The computer system/processor 1230 may be used to control the X-ray source and the X-ray gantry, as illustrated in FIG. 12.

The X-ray source in the hybrid neuromorphic imaging system is composed of an X-ray generator which provides high-voltage and direct current to an X-ray tube. The voltage is adjustable under the control of the computer. The computer also controls the timing of the X-ray generator output and monitors the dose of the X-ray radiation produced by the X-ray tube.

The X-ray tube uses the high voltage produced by the generator to accelerate electrons from an electron source in the tube towards a target, producing broad spectrum and characteristic energy X-ray photons. These photons are filtered and directed toward the object.

In this embodiment, the X-ray radiation produced by the X-ray source is continuous. It is also at a lower dose rate than might otherwise be required in a standard high-voltage pulsed X-ray source.

The continuous X-ray source removes the need for a high-voltage pulsed generator, an X-ray tube which can dissipate the thermal energy from high voltage X-ray pulses, and, depending on the design, the hardware and software complexity of a gridded tube to trigger precisely the X-ray exposure.

Figure 13:
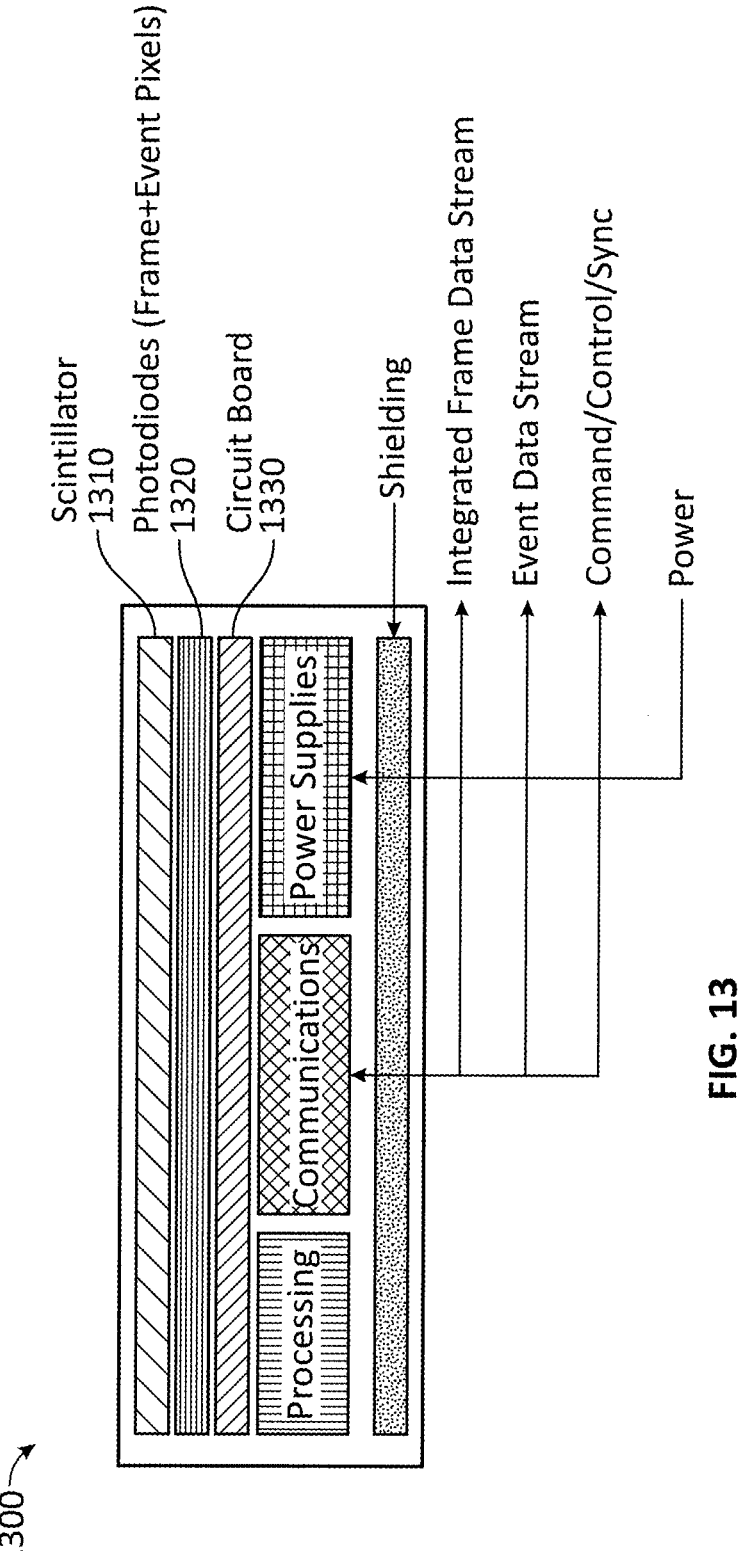
FIG. 13 illustrates a schematic of a hybrid X-ray detector with its components, in accordance with various embodiments.

FIG. 13 illustrates a schematic of a hybrid X-ray detector 1300 with its components, in accordance with various embodiments. As illustrated in FIG. 13, the hybrid neuromorphic X-ray detector 1300 includes an X-ray scintillator 1310, a silicon-based detector (photodiodes) 1320, a circuit board 1330, and various processing electronics, power supply, and communications electronics. The X-ray scintillator 1310, as described previously, converts X-ray photons into visible light photons. While the prevailing premium scintillator material for medical imaging is a Thallium-doped structured Cesium-Iodide, other scintillator technologies are applicable to the hybrid neuromorphic X-ray detector 1300.

The silicon device(s), such as photodiodes 1320, can detect the visible light photons in two ways. The device contains pixels which operate in an integrating mode, producing keyframes. The device also includes neuromorphic pixels which operate in an event mode, producing a continuous stream of events that exceed the pixel thresholds.

In some embodiments, the detector processor receives the intensity data from the integrating pixels and forms a keyframe image which is transferred to the host computer at a pre-defined frame rate. The detector processor also receives the time-stamped event data and creates a digital stream which is transferred asynchronously to the host computer.

All data, the frame-based and the event-based data are passed to the host computer through a high-speed digital link. The high-speed digital link from the hybrid neuromorphic X-ray detector to the computer hosts the detector command and control plus the frame-based and event-based digital streams.

The demands on this high-speed digital link vary depending on the nature of the data it must transfer. Frame-based data requires a continuous transfer rate based on the number of pixels and the frame rate requested. The event-based data may have high-speed, high-volume transfer requirements, but this depends on the amount of movement in the image (and hence the number of events triggered).

An advantage introduced with the event-based image stream is that it does not require a constant high volume data transfer. This is especially true in medical imaging where the majority of the image is static and there is motion only in specific regions of interest. While this does not eliminate the high-speed requirement for the data transfer link as the frame-based data flow still exists, it does mitigate the bandwidth needed for high frame rate imaging.

In accordance with various embodiments, an imaging system is disclosed. The imaging system is a hybrid neuromorphic X-ray imaging system and can include an X-ray detector configured to detect X-rays associated with an imageable event and to generate two types of datasets based on the detected X-rays. The X-ray imaging system can also include a processor communicatively coupled to the X-ray detector and configured to reconstruct one or more images of the imageable event based on the two types of generated datasets. In some embodiments, the X-ray imaging system with the X-ray detector can produce both event and integrating image data, and the processor that uses the image data to reconstruct either frame based or other types of output image data. The output image data can be reconstructed differently based on the requirements of the application.

In various embodiments of the X-ray imaging system, the X-ray detector can include a pixel matrix comprising a first type of pixels and a second type of pixels. In various embodiments, the first type of pixels includes event-based pixels and the second type of pixels includes integrating pixels. In various embodiments, a first type of the two types of datasets includes event-based image data and a second type of the two types of datasets includes integrated image data. In various embodiments, the event-based image data are generated from X-rays detected via the event-based pixels and the integrated image data are generated from X-rays detected via the integrating pixels.

In various embodiments, the X-ray detector includes a layer of material configured for creating an electron/hole pair when an X-ray photon impinges on a pixel, which can be referred to herein as a direct detection technology. In various embodiments, the X-ray detector includes a scintillator layer configured for converting X-ray photons to visible light photons and a photodiode array for capturing the visible light photons, which can be referred to herein as an indirect detection technology.

In various embodiments, the first type of pixels includes pixels with different physical dimensions and/or different sensitivity from those of the second type of pixels. In various embodiments, the first type of pixels and the second type of pixels are configured to operate in a mode, in which both the event-based image data and the integrated image data are generated via both the first type and the second type of pixels. In other words, the X-ray detector includes pixels that can operate in both integrating and event modes, whereas the processor can be configured to control the mode of operation of detector pixels based on application or imaging conditions including the real-time control mode.

In various embodiments, the processor can be further configured to monitor the event-based image data from the event-based pixels and to adjust integrating time for the integrating pixels for improved capture of dynamic processes of the imageable event. In various embodiments, the processor can be configured to reconstruct the one or more images by generating a hybrid dataset of image frames from the two types of generated datasets using a neural network.

In various embodiments, the first type of pixels has a lower spatial resolution than the second type of pixels, wherein the processor can be further configured to apply a neural network to increase resolution of the first type of pixels. In another word, the X-ray detector employs a subarray of integrating or, alternatively, event-based pixels that has lower spatial resolution than the pixels of the other functionality, and for which, AI algorithm based super-resolution can be used to improve that resolution. In various embodiments, the processor can be further configured to reconstruct the one or more images as frame-based X-ray image data and a frame rate of the frame-based X-ray image data is higher than a frame rate of the integrated image data generated directly from the integrating pixels of the X-ray detector.

In various embodiments, the processor can be further configured to select a mode of operation in real-time based on an X-ray profile, wherein the X-ray profile comprises collimation of X-rays over a selected region of interest of the X-ray detector during an imaging procedure.

Figure 14:
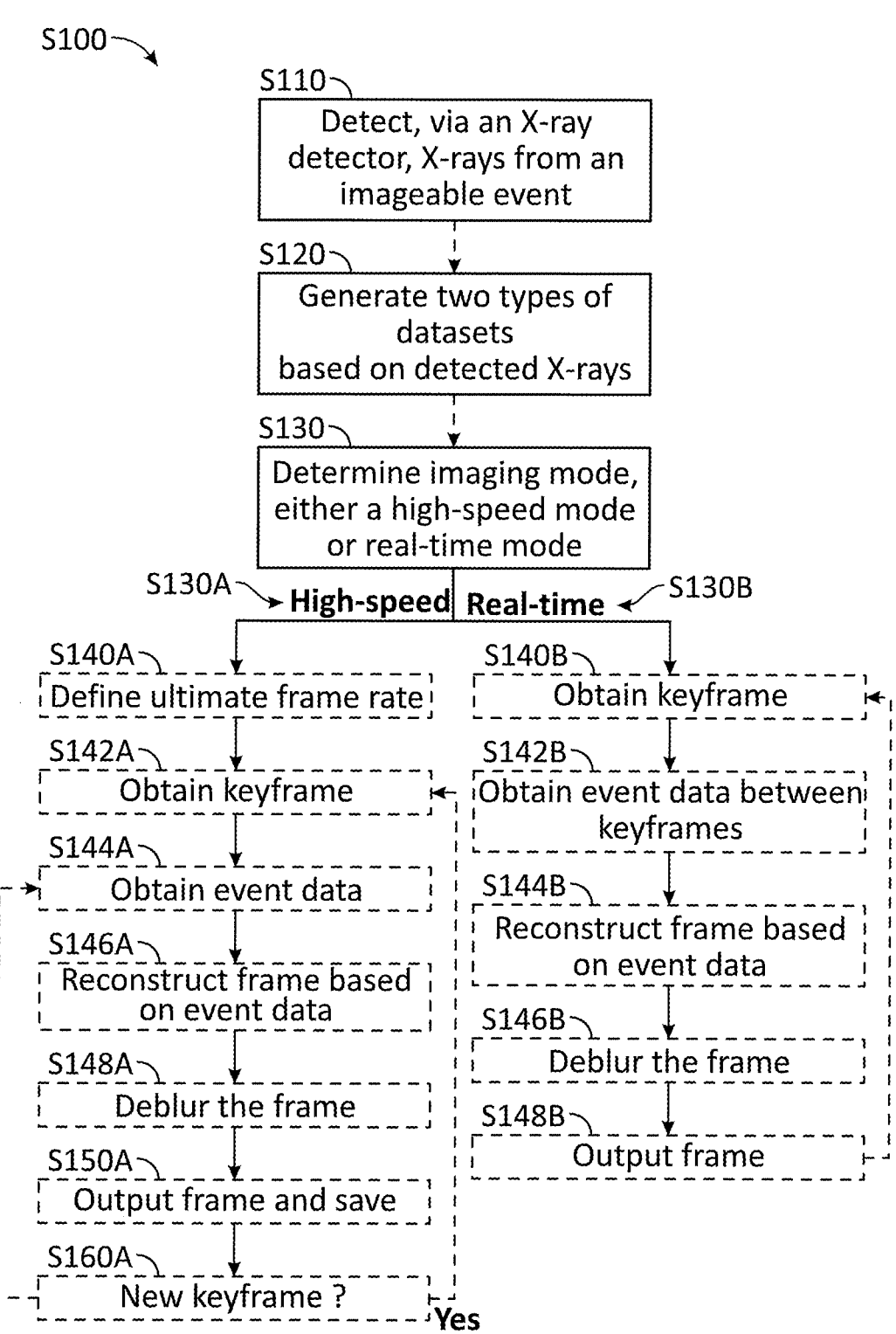
FIG. 14 illustrates a flowchart for a method of forming X-ray images, in accordance with various embodiments.

FIG. 14 illustrates a flowchart S100 for a method of forming X-ray images, in accordance with various embodiments. The method S100 includes, at step S110, detecting, via an X-ray detector, X-rays from an imageable event, at step S120, generating two types of datasets based on detected X-rays, and at step S130, determining an imaging mode between a high-speed mode (as step S130A) or a real-time mode (as step S130B) based on the two types of generated datasets. The X-ray detector can be a part of the hybrid neuromorphic X-ray imaging system as described herein. In various embodiments, a first type of the two types of datasets includes event-based image data and a second type of the two types of datasets includes integrated image data. In various embodiments, the X-ray detector includes a pixel matrix comprising event-based pixels and integrating pixels, and wherein generating of the two types of datasets comprises generating the event-based image data from X-rays detected via the event-based pixels, and generating the integrated image data from X-rays detected via the integrating pixels.

If the imaging mode is determined to be the high-speed imaging mode at step S130A, the method S100 may further include, optionally, at step S140A, defining a frame rate for capturing the imageable event; at step S142A, obtaining a keyframe; at step S144A, obtaining event data subsequent to the keyframe; at step S146A, reconstructing the keyframe based on the event data; at step S148A, deblurring the keyframe; at step S150A, outputting the keyframe and saving the keyframe for viewing a later time. In some embodiments, the method S100 further includes, optionally, at step S160A, repeating the steps S142A-S150A, as desired.

If the imaging mode is determined to be the real-time imaging mode at step S130B, the method S100 may further include, optionally, at step S140B, obtaining a keyframe; at step S142B, obtaining event data subsequent to the keyframe or between keyframes; at step S144B, reconstructing the keyframe based on the event data; at step S146B, deblurring the keyframe; and at step S148B, outputting the keyframe.

Figure 15:
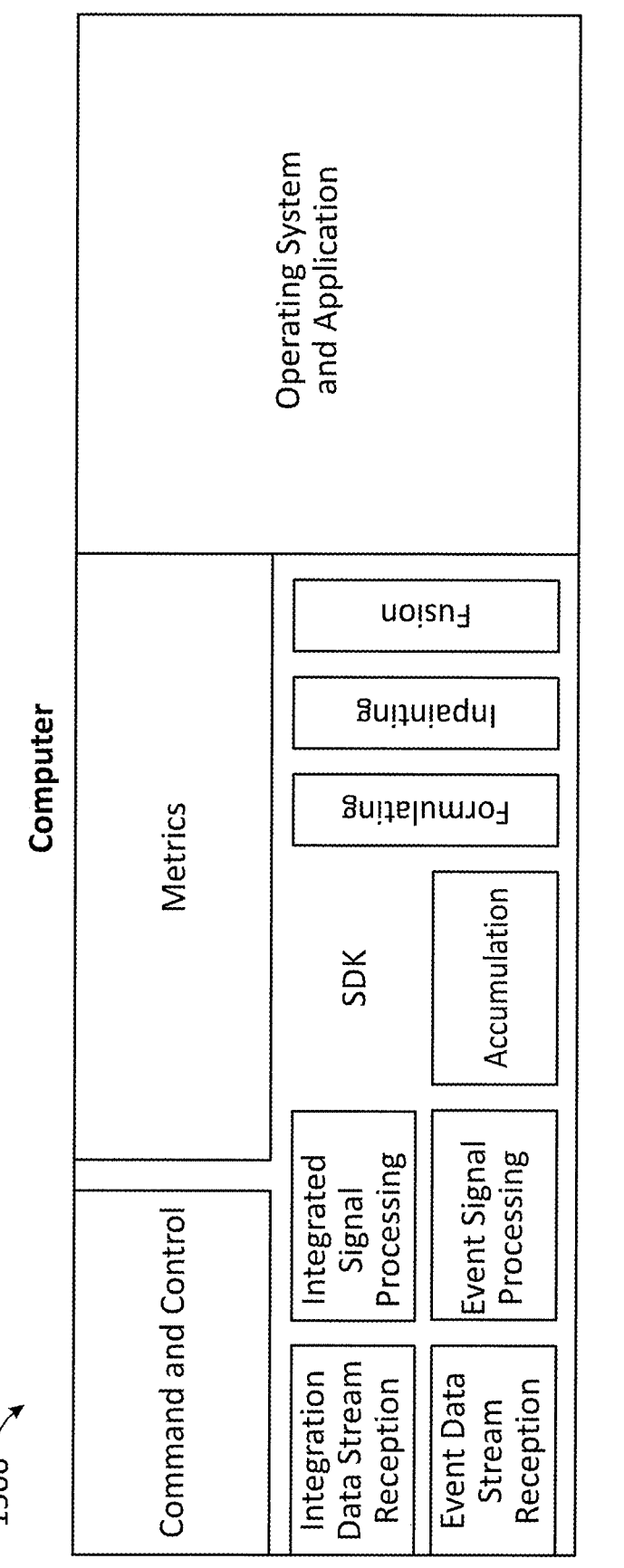
FIG. 15 illustrates various components, including software development kit (SDK) components, of a computer system, in accordance with various embodiments.

FIG. 15 illustrates various components, including software development kit (SDK) components, of a computer/computer system 1500, in accordance with various embodiments. In such systems, the high-speed data link to the computer 1500 is connected through the computer hardware to a custom software development kit (SDK). The SDK handles all command and control to the hybrid neuromorphic detector and receives the two data streams. The SDK is incorporated into the system software and interacts with the user and the user interface designed for the system, as depicted in FIG. 15.

Command and control of the hybrid neuromorphic detector is one of the prime functions of the SDK. The user selects the type of application, via the user interface, for which the system is to be used. The computer then commands the SDK to setup the hybrid neuromorphic detector for this specific application. When the setup is defined and completed, the user interface is ready to either modify the setup parameters or initiate the acquisition sequence.

Setup parameters may include the keyframe rate for the frame-based imaging, a region of interest, binning (combining two or more pixels into a single pixel), and the size or distribution of the event-based pixels (if the design permits this feature).

The setup for the neuromorphic pixels includes the intensity trigger thresholds (both positive and negative), region of interest, event-window timing, and accumulation time (the concept of combining inputs from event pixels in time). The accumulation time defines the range of time stamps which will be combined into a single "frame".

During image acquisition, the frame-based data is received by the SDK at the keyframe rate defined by the system control parameters. Depending on the design, keyframe image processing may be applied. This includes items like defective pixel correction and offset and gain correction. The keyframe is then ready to receive updates from the event-based data stream.

The event-data stream is also received by the SDK, based on the thresholds defined by the application and the user setup. In the preferred embodiment, the event stream is a continuous asynchronous flow into the SDK, based only on the pre-defined thresholds. Event-based data may also require correction for pixels which are not functioning per specification. In this case, any event data from a "dead" pixel may be discarded.

To prepare the event data stream for hybrid imaging, the event data are combined into a single "frame" as defined by the accumulation time parameters in the application or by the user. This accumulation time parameter for the event-based data stream will define the ultimate frame rate for the image sequence, see FIG. 7.

In some embodiments, the SDK fuses the event-based data stream with the frame-based data stream, creating a new series of frame-based data to be sent to the system application.

Figure 16:
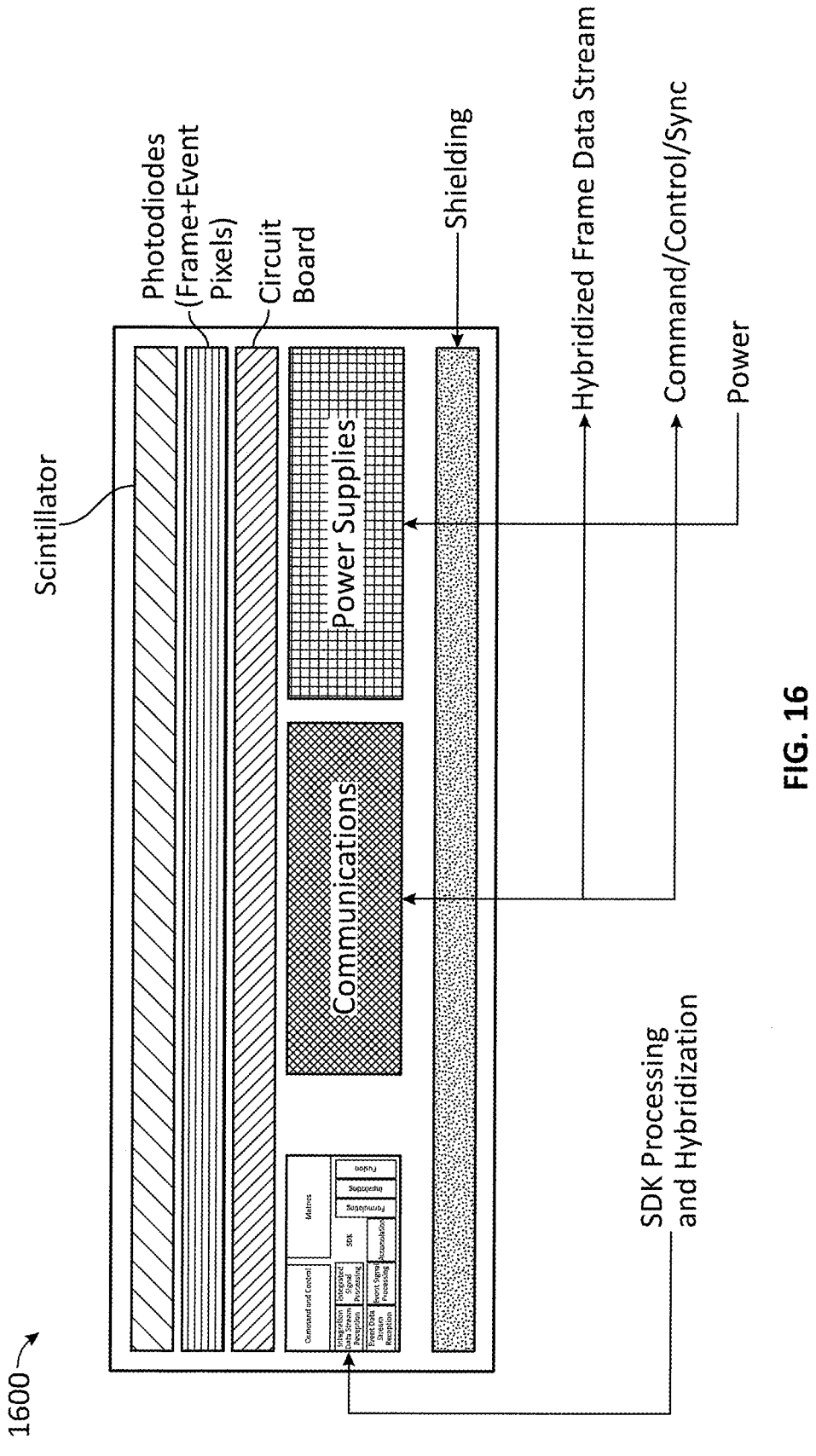
FIG. 16 is a schematic illustration of a hybrid detector-based processing, in accordance with various embodiments.

In various embodiments, the frame-based and event-based data streams can be combined in the SDK hosted by the computer. FIG. 16 is a schematic illustration of a hybrid detector-based processing, in accordance with various embodiments. As illustrated in FIG. 16, the data streams are combined and hybridized in the detector, simplifying the data transfer and the architecture of the SDK.

In the embodiment where the data streams are combined in the detector, the process used is the same as that done by the SDK. However, in this case, the processing and data storage as the frames are built is done with onboard RAM and processing units.

In this design, the output data stream of the detector is a single frame-based stream at the frame rate defined by the application or set by the user. While this design simplifies the design of the SDK, it increases the complexity of the data transfer from the detector to the SDK. Now, instead of an event stream and a frame-based data stream at a lower frame rate, the combined data stream must be transferred at the high event-based frame rate. This can place additional stress on the transfer hardware, increasing the transmission bandwidth requirements.

In addition to the functions related to image handling and image processing, the SDK also provides data about the performance of the detector and the hybrid image chain to the host system. The performance data also includes image metadata related to the image streams. These data include exposure times, exposure intensity, pixel statistics (including histograms), and event stream counts as a function of time.

Pixel performance characteristics may be maintained in maps within the SDK and/or the detector (depending on the system design). These maps are used to correct for pixel defects and adjust calibration values as required to maintain optimum imaging performance.

Pixel data includes data concerning the performance of individual pixels. The term "dead pixel" is reserved for pixels which are not responding at all or are "blinking", i.e., pixels whose output alternates between off and some level of on without any photon input. Partial pixels, pixels which are functioning pixels that do not respond in the same way as other pixels in the camera, are also mapped.

Dark current is a measure of the frame-based pixel output when there is no X-ray input and may also be mapped. Dark current results in an offset while the shot noise associated with the dark current results in dark noise. The detector noise in the absence of X-ray radiation is a combination of dark noise and read noise.

Gain is the ratio of reported output for a known input in the frame-based pixels. Gain and offset maps are used to perform "flat field correction" so that the output of the frame-based pixels is uniform across the detector for a controlled input.

The performance of the event-based pixels is linked to the capability to maintain a constant threshold (positive and negative) with temperature and across all the event-based pixels. Thresholds may be measured by creating a known change in X-ray intensity and mapping the resulting changes in the event-based pixels.

All calibration data may be performed at the manufacturing site or onsite by service personnel with the appropriate equipment and training. The SDK maintains the performance calibration data of the detector in internal storage and reports these characteristics as well as real-time digital performance data to the host computer either when an error occurs, or on request.

The SDK may also link to a cloud-based server and report the afore-mentioned parameters to a server for analysis by the system or the detector manufacturer. The SDK may create periodic reports of the hybrid neuromorphic X-ray detector that may contain all the performance data referenced previously as well as the performance of the detector over time.

The hybrid neuromorphic imaging system also contains a gantry which maintains a known relationship between the X-ray source and the hybrid X-ray neuromorphic detector.

While a gantry is not an absolute requirement for an X-ray system, in medical use, the regulatory requirements are such that some method to align the source and the detector are required.

Similar to standard X-ray imaging, a hybrid neuromorphic X-ray system requires a high-voltage generator. The generator may be a "standard" X-ray generator which takes an alternating current (AC) input and converts it into a switchable high-voltage direct current pulses, or it may be a generator which produces X-rays continuously with a continuous DC high-voltage. While both types can be used, the system requirements for a continuous generator are less severe than a generator that is required to produce high-voltage pulses.

Both generators must have controls for the X-ray technique. The X-ray technique includes parameters like the voltage and the current as a function of time the generator will produce during an exposure. The X-ray technique will affect the neuromorphic output in addition to that of the integrating output.

For example, the integration time is critical for an integrating detector to receive enough dose on a pixel to form an image. In the neuromorphic detector, however, it is change in the X-ray dose which is important as this generates charge that can exceed the neuromorphic pixel trigger threshold, signaling an event.

The high voltage supplied by the X-ray generator is responsible for determining the energy spectrum of X-rays incident on the target. The selection of this high voltage is a key element of the X-ray technique and is specific to the X-ray imaging application.

The reason for the importance of the high voltage is that X-ray attenuation as they pass through different materials is a function of the energy of the X-ray. It is the variety of materials within the object being imaged and their attenuation differences when irradiated with a specific X-ray energy spectrum which results in a grey-scale image of the object.

Because of the variation in attenuation with X-ray energy, this characteristic may be used to generate images where specific materials can be differentiated. To do this, the imaging system must have the capability to control the effective X-ray energy during the imaging session.

One method to generate different X-ray spectra is to design an X-ray generator that is capable of rapid changes in the high-voltage. This type of high-voltage change is called "kV switching" and allows the generator to produce at least two different X-ray spectra in rapid succession.

To take advantage of the capabilities of the multi-spectral imaging system, the X-ray detector must respond in a predictable way to a wide range of X-ray energies. X-ray detectors for use in medical diagnostics are sensitive over a wide range of X-ray energies (from approximately 40 kV to 150 kv).

Spectral imaging utilizing a generator capable of varying the spectral output of the X-ray source can be enhanced by the characteristics of the hybrid neuromorphic X-ray detector. In particular, the wider dynamic range enabled by the neuromorphic pixels allows imaging of very low signal level motion or motion that occurs near edges with high contrast.

The speed capabilities of the hybrid neuromorphic X-ray detector also enhance the imaging of vascular and cardiac events where blood flow and rapid organ movement may be captured, adding the ability to image spectral differences based on the generator and control capabilities.

The neuromorphic imaging system described herein is under user control based on a computer-generated user interface. This interface provides access to the control parameters of the imaging system in addition to the configuration parameters for the imaging system components.

One of the primary controls of the imaging system is the control of X-ray radiation. Lockouts, access approvals, technique selection, and exposure management are all processes which must be controlled for the safety of the patient (in the case of a medical application), the technician, and anyone who might be near the imaging system during use.

The user control of the imaging system must also include the basic characteristics of the imaging mode. This includes modes like standard radiographs, fluoroscopic imaging, and tomography. In all modes, the imaging may be performed with a single X-ray spectrum (similar to current X-ray imaging), or they may be performed in a multi-spectral imaging mode employing kV switching or other means to vary the X-ray spectra. The user control can also define the type of image acquired. This may be an integrated image, a neuromorphic image, or a combination of the two. In the case of a combination of the two imaging modes, the ratio of frames, the keyframe rate, the neuromorphic imaging thresholds and the neuromorphic resolution must be configured.

Once the appropriate setup configuration is registered by the computer system, the target is positioned within the X-ray beam and the operator may initiate the exposure. The system can initiate the exposure sequence based on the configuration parameters, terminating the X-ray exposure per the setup parameters or if a safety event triggers a system shut down. The data streams during exposure are collected and transferred to the computer system via the software SDK. These data are then converted and processed to generate a frame-based image that is either stored on the computer for later viewing or for viewing immediately as part of a surgical or interventional procedure.

The invention claimed is:

1. An imaging system, comprising:
an X-ray detector comprising integrating pixels and neuromorphic pixels and configured to detect X-rays associated with an imageable event and to generate two types of datasets based on the detected X-rays, one of the two types of datasets comprising integrated image data generated by the integrating pixels, the other of the two types of datasets comprising event-based image data generated by the neuromorphic pixels; and
a processor communicatively coupled to the X-ray detector and configured to reconstruct one or more images of the imageable event based on the two types of generated datasets;
wherein the processor is further configured to use the event-based image data generated by the neuromorphic pixels to deblur the integrated image data generated by the integrating pixels.

2. The imaging system of claim 1, wherein the X-ray detector comprises a pixel matrix comprising the integrating pixels and the neuromorphic pixels.

3. The imaging system of claim 2, wherein the neuromorphic pixels are distributed throughout the pixel matrix, and the integrating pixels are distributed throughout the pixel matrix.

4. The imaging system of claim 3, wherein the neuromorphic pixels have a periodic distribution throughout the pixel matrix.

5. The imaging system of claim 4, wherein the neuromorphic pixels have a density of at most 50% in the pixel matrix.

6. The imaging system of claim 1, wherein the X-ray detector comprises a layer of material configured for creating an electron/hole pair when an X-ray photon impinges on a pixel.

7. The imaging system of claim 1, wherein the X-ray detector comprises a scintillator layer configured for converting X-ray photons to visible light photons and a photodiode array for capturing the visible light photons.

8. The imaging system of claim 2, wherein each of the neuromorphic pixels has different physical dimensions from each of the integrating pixels.

9. The imaging system of claim 1, wherein the neuromorphic pixels and the integrating pixels are configured to operate in a mode, in which both the event-based image data and the integrated image data are generated via both the neuromorphic and the integrating pixels.

10. The imaging system of claim 5, wherein the neuromorphic pixels have of at least 11% in the pixel matrix.

11. The imaging system of claim 1, wherein the processor is configured to reconstruct the one or more images by generating a hybrid dataset of image frames from the two types of generated datasets using a neural network.

12. The imaging system of claim 2, wherein the neuromorphic pixels have a lower spatial resolution than the integrating pixels, wherein the processor is further configured to apply a neural network to increase resolution of the neuromorphic pixels.

13. The imaging system of claim 5, wherein the processor is further configured to select a mode of operation in real-time based on an X-ray profile, wherein the X-ray profile comprises collimation of X-rays over a selected region of interest of the X-ray detector during an imaging procedure.

14. An imaging system, comprising:
an X-ray detector configured to detect X-rays associated with an imageable event and to generate two types of datasets based on the detected X-rays; and
a processor communicatively coupled to the X-ray detector and configured to reconstruct one or more images of the imageable event based on the two types of generated datasets;
wherein the X-ray detector comprises a pixel matrix comprising a first type of pixels and a second type of pixels;
wherein the first type of pixels comprises event-based (or neuromorphic) pixels and the second type of pixels comprises integrating pixels;
wherein a first type of the two types of datasets comprises event-based image data and a second type of the two types of datasets comprises integrated image data;
wherein the event-based image data are generated from X-rays detected via the event-based pixels and the integrated image data are generated from X-rays detected via the integrating pixels;
wherein the processor is further configured to reconstruct the one or more images as frame-based X-ray image data and a frame rate of the frame-based X-ray image data is higher than a frame rate of the integrated image data generated directly from the integrating pixels of the X-ray detector.

15. The imaging system of claim 14, wherein each integrated image generated directly from the integrating pixels is immediately succeeded by a plurality of images reconstructed as frame-based image data using the neuromorphic pixels, each of the plurality of images being reconstructed using the immediately preceding frame-based image the integrated image data generated over a frame period is fused with the event based image.

16. A method, comprising:
detecting, via an X-ray detector, X-rays from an imageable event, wherein the X-ray detector comprises a pixel matrix comprising integrating pixels and neuromorphic pixels;
generating two types of datasets based on detected X-rays, one of the two types of datasets comprising integrated image data generated by the integrating pixels, the other of the two types of datasets comprising event-based image data generated by the neuromorphic pixels; and
reconstructing one or more images of the imageable event based on the two types of generated datasets;
wherein reconstructing the one or more images comprises reconstructing the one or more images as frame-based X-ray image data, wherein a frame rate of the frame-based X- ray image data is higher than a frame rate of the integrated image data generated directly from the integrating pixels of the X-ray detector.

17. The method of claim 16, wherein each integrated image generated directly from the integrating pixels is immediately succeeded by a plurality of images reconstructed as frame-based image data using the neuromorphic pixels.

18. The method of claim 16, wherein the neuromorphic pixels are distributed throughout the pixel matrix, and the integrating pixels are distributed throughout the pixel matrix.

19. The method of claim 16, wherein the method further comprises:
defining a frame rate for capturing the imageable event;
obtaining a keyframe;
obtaining event data subsequent to the keyframe;
reconstructing the keyframe based on the event data;
deblurring the keyframe;
outputting the keyframe; and
saving the keyframe for viewing a later time.

20. The method of claim 16, wherein the determined imaging mode is the real- time imaging mode, the method further comprises:
obtaining a keyframe;
obtaining event data subsequent to the keyframe;
reconstructing the keyframe based on the event data;
deblurring the keyframe; and
outputting the keyframe.

\*    \*    \*    \*    \*